(12) United States Patent
Peng et al.

(10) Patent No.: US 12,537,752 B2
(45) Date of Patent: Jan. 27, 2026

(54) PACKET FORWARDING METHOD AND APPARATUS, AND COMMUNICATION NETWORK

(71) Applicant: HUAWEI TECHNOLOGIES CO., LTD., Shenzhen (CN)

(72) Inventors: Shuping Peng, Beijing (CN); Hongjie Yang, Beijing (CN); Tianran Zhou, Beijing (CN); Peng Wu, Nanjing (CN); Zhenbin Li, Beijing (CN); Yu Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/524,258

(22) Filed: Nov. 30, 2023

(65) Prior Publication Data

US 2024/0098004 A1  Mar. 21, 2024

Related U.S. Application Data

(63) Continuation of application No. PCT/CN2022/096052, filed on May 30, 2022.

(30) Foreign Application Priority Data

Jun. 4, 2021 (CN) .......................... 202110625901.X

(51) Int. Cl.
*H04L 43/026* (2022.01)
*H04L 43/062* (2022.01)

(52) U.S. Cl.
CPC .......... *H04L 43/026* (2013.01); *H04L 43/062* (2013.01)

(58) Field of Classification Search
CPC ... H04L 41/0894; H04L 43/028; H04L 43/20; H04L 45/34; H04L 45/64; H04L 45/38;
(Continued)

(56) References Cited

U.S. PATENT DOCUMENTS

2015/0281173 A1* 10/2015 Quinn .................. H04L 61/256
                                                         709/245
2017/0099228 A1*  4/2017 Hunsperger ............ G06F 9/545
(Continued)

FOREIGN PATENT DOCUMENTS

CN       111049757 A       4/2020
CN       111654923 A  *    9/2020   ........ H04W 36/0011
(Continued)

OTHER PUBLICATIONS

Li et al., "Application-Aware IPv6 Networking (APN6) Encapsulation", Network Working Group, Internet—Draft, https://www.ietf.org/archive/id/draft-li-6man-app-aware-ipv6-network-03txt, IETF Trust, Feb. 22, 2021, 14 pages.

*Primary Examiner* — Anh Nguyen
(74) *Attorney, Agent, or Firm* — Maier & Maier, PLLC

(57) ABSTRACT

A packet forwarding method and apparatus, and a communication network, related to the field of communication technologies. In the solutions provided, a controller may obtain a correspondence between an application-aware identifier of a service flow and a network service required for transmitting the service flow, and deliver the correspondence to a network device. Further, when identifying the service flow as a service flow indicated by the application-aware identifier, the network device may directly forward a packet of the service flow by using the corresponding network service. The controller may establish and deliver the correspondence between the application-aware identifier and the network service, so that the network device can directly forward the service packet of the service flow based on the correspondence. Therefore, flexibility of forwarding the service packet is effectively improved.

19 Claims, 13 Drawing Sheets

(58) Field of Classification Search
CPC ... H04L 47/2425; H04L 47/2475; H04L 45/306
See application file for complete search history.

(56) References Cited

U.S. PATENT DOCUMENTS

| | | | |
|---|---|---|---|
| 2017/0238150 A1* | 8/2017 | Wang | H04W 48/18 |
| | | | 370/312 |
| 2020/0229042 A1* | 7/2020 | Srivastava | H04L 69/22 |
| 2023/0231780 A1* | 7/2023 | Qiu | H04L 43/026 |
| | | | 370/252 |

FOREIGN PATENT DOCUMENTS

| | | |
|---|---|---|
| CN | 111726839 A | 9/2020 |
| CN | 111953553 A | 11/2020 |
| CN | 112398557 A | 2/2021 |

* cited by examiner

| SLA level | Application identifier | User identifier | Flow identifier | Arguments |

| Locator address | Function identifier | Arguments |

PACKET FORWARDING METHOD AND APPARATUS, AND COMMUNICATION NETWORK

CROSS-REFERENCE TO RELATED APPLICATIONS

This application is a continuation of International Application No. PCT/CN2022/096052, filed on May 30, 2022, which claims priority to Chinese Patent Application No. 202110625901.X, filed on Jun. 4, 2021. The disclosures of the aforementioned applications are hereby incorporated by reference in their entireties.

TECHNICAL FIELD

The embodiments relate to the field of communication technologies and to a packet forwarding method and apparatus, and a communication network.

BACKGROUND

In an application-aware network (APN), a service packet that is of an application and that is sent by a user terminal may carry application-aware information, which is also referred to as application feature information. The application-aware information may include an application-aware identifier and service requirement information. The application-aware identifier may include an application identifier, a user identifier, a flow identifier, and the like. The service requirement information may include a requirement for performance parameters such as a latency, a bandwidth, and a packet loss rate.

After receiving the service packet that carries the application-aware information, a network device in the APN may forward the service packet based on the application-aware information and in a forwarding manner that can ensure the requirement. However, the forwarding manner of the service packet is single.

SUMMARY

The embodiments include a packet forwarding method and apparatus, and a communication network to resolve a problem that a forwarding manner of a service packet is single.

According to a first aspect, a packet forwarding method is provided, applied to a controller in a network, and the method includes: obtaining, based on a user requirement of a target service flow, a correspondence between a first application-aware identifier of the target service flow and a first network service required for transmitting the target service flow; and sending the correspondence to a first network device, where the correspondence is used by the first network device to determine, based on the first application-aware identifier, the first network service used to forward a service packet of the target service flow. That is, the first network device may forward the service packet of the target service flow by using the first network service.

The controller may establish and deliver the correspondence between the application-aware identifier of the service flow and the network service, so that the network device can directly forward the service packet of the service flow based on the correspondence, and provide, for a specific application, a network service that can meet a user requirement corresponding to the application. Therefore, flexibility of forwarding the service packet is effectively improved.

Optionally, the correspondence includes an identifier of the first network service, and the identifier of the first network service may include: a binding segment identifier (BSID) and/or an identifier of a network slice. The BSID may be a BSID of a forwarding path, or may be a BSID of a segment routing (SR) policy to which a forwarding path belongs.

Optionally, the first application-aware identifier may include at least one of a user identifier and an application identifier. The user identifier indicates a user to which the target service flow belongs, and the application identifier indicates an application to which the target service flow belongs.

Optionally, the first application-aware identifier may further include at least one of a flow identifier, a service level agreement (SLA) level, or a service requirement. The service requirement may be a requirement for performance indicators such as a latency and a packet loss rate, and the flow identifier in the first application-aware identifier is also referred to as a session identifier (session ID).

Optionally, the method may further include: sending the first application-aware identifier of the target service flow to a second network device, where the first application-aware identifier is used by the second network device to encapsulate the application-aware identifier of the target service flow in the service packet of the target service flow if the second network device determines that the received service flow is the target service flow.

The second network device may be an application-aware edge device in an application-aware network (APN). After the application-aware edge device encapsulates the application-aware identifier of the target service flow in the service packet of the target service flow, a downstream network device may determine, based on the application-aware identifier, the network service used to forward the target service flow, or may report the application-aware identifier of the target service flow when reporting an in-situ flow detection result of the target service flow.

Optionally, the method may further include: sending an identifier generation rule to the second network device, so that the second network device generates a second application-aware identifier of the target service flow according to the identifier generation rule, and the second application-aware identifier is used to match the first application-aware identifier to determine that the received service flow is the target service flow.

The second network device may obtain feature information (for example, 5-tuple information or traffic feature information) that is of the service flow and that is received by the second network device, and process the feature information according to the identifier generation rule delivered by the controller, to generate the second application-aware identifier. Therefore, it can be ensured that the second application-aware identifier accurately matches the first application-aware identifier delivered by the controller. That is, reliability of identifying the target service flow by the second network device is ensured.

Optionally, the method may further include: obtaining the user requirement of the target service flow through a northbound interface. For example, the controller may obtain, through the northbound interface of the controller, the user requirement that is of the target service flow and that is sent by a frontend.

Optionally, the method may further include: receiving an in-situ flow detection result and a target application-aware identifier that are sent by a third network device, where the target application-aware identifier is an application-aware identifier of a service flow to which the in-situ flow detection result belongs, and the target application-aware identifier is the first application-aware identifier, or the second application-aware identifier that is of the target service flow and that is generated by the network device; and analyzing transmission performance of the target service flow based on the in-situ flow detection result and the target application-aware identifier.

The third network device may be a node on an in-situ flow detection path of the target service flow. The target application-aware identifier may include one or more identifiers, and the controller can analyze the transmission performance of the service flow by using a granularity indicated by at least one of the identifiers, so that flexibility of detecting and analyzing the transmission performance of the service flow is effectively improved.

Optionally, the method may further include: displaying a performance indicator of the target service flow based on a target granularity, where the performance indicator indicates the transmission performance of the target service flow; and the target granularity is a granularity indicated by at least one identifier in the target application-aware identifier.

The target application-aware identifier may include one or more identifiers, and the controller displays the performance indicator based on the granularity indicated by the at least one identifier. Therefore, refined display of the performance indicator can be implemented, and the display granularity can also be flexibly adjusted.

Optionally, the method may further include: determining, based on the transmission performance of the target service flow, that the first network service does not meet the user requirement of the target service flow; determining that a network service required for transmitting the target service flow is a second network service; and sending a correspondence between the first application-aware identifier and the second network service to the first network device.

The controller can update, in time based on the detected transmission performance of the target service flow, the network service required for transmitting the target service flow. Therefore, it can be ensured that the updated network service can meet the transmission performance of the target service flow, so that reliable transmission of the target service flow is ensured.

Optionally, before the receiving an in-situ flow detection result and a target application-aware identifier that are sent by a third network device, the method may further include: sending a sending policy of the target service flow to the first network device and/or the third network device, where the sending policy indicates to report the in-situ flow detection result of the target service flow.

The controller may deliver the sending policy, so that the network device reports only the in-situ flow detection result of a key service flow. Therefore, a reporting granularity of the in-situ flow detection result is flexibly adjusted, and data processing pressure of the controller is also effectively reduced.

Optionally, a process of receiving an in-situ flow detection result and a target application-aware identifier that are sent by a third network device may include: receiving the in-situ flow detection result, the target application-aware identifier, and a corresponding in-situ flow detection flow identifier that are sent by the third network device, where the in-situ flow detection flow identifier is also referred to as a monitoring flow identifier, and may indicate a monitored data flow in the target service flow.

Correspondingly, a process of analyzing transmission performance of the target service flow based on the in-situ flow detection result and the target application-aware identifier may include: determining, based on a correspondence between the target application-aware identifier and the in-situ flow detection flow identifier, at least one data flow included in the target service flow; and analyzing, based on the in-situ flow detection result, transmission performance of the at least one data flow included in the target service flow.

The controller may determine, based on the correspondence between the target application-aware identifier and the in-situ flow detection flow identifier, the at least one monitored data flow included in the target service flow, and may further analyze the transmission performance of the target service flow based on the transmission performance of the at least one data flow.

Optionally, the user requirement of the target service flow includes one or more of the following requirements: a requirement for a specified forwarding path, a requirement for a specified network slice, and a requirement for a performance indicator of transmission performance.

According to a second aspect, a packet forwarding method is provided, applied to a network device, and the method includes: receiving a correspondence that is between a first application-aware identifier and a first network service and that is sent by a controller in a network, and if a received target service flow is a service flow indicated by the first application-aware identifier, forwarding a service packet of the target service flow by using the first network service and based on the correspondence, where the first application-aware identifier is generated by the controller based on a user requirement of the service flow.

Optionally, the method further includes: obtaining a second application-aware identifier of the target service flow from the service packet of the target service flow; and if the second application-aware identifier matches the first application-aware identifier, determining that the target service flow is the service flow indicated by the first application-aware identifier.

Optionally, the service packet received by the network device includes in-situ flow information telemetry (IFIT) information, and the second application-aware identifier is encapsulated in a flow identifier field or a reserved field of the IFIT information.

Alternatively, the second application-aware identifier is encapsulated in a destination address (DA) field, a hop-by-hop option header (HBH), a destination option header (DOH), or a segment routing header (SRH) of the service packet.

Optionally, the second application-aware identifier is encapsulated in a binding segment identifier field of the SRH field.

Optionally, the method further includes: receiving an identifier generation rule sent by the controller; generating a second application-aware identifier of the target service flow according to the identifier generation rule; and if the second application-aware identifier matches the first application-aware identifier, determining that the target service flow is the service flow indicated by the first application-aware identifier.

Optionally, the service packet received by the network device includes IFIT information; and a process of forwarding a service packet of the target service flow by using the first network service may include: encapsulating a target application-aware identifier in a flow identifier field or a reserved field of the IFIT information; and forwarding, by using the first network service, the service packet in which the target application-aware identifier is encapsulated.

The network device may further encapsulate the application-aware identifier of the service flow in the IFIT information, so that flexibility of encapsulating the application-aware identifier is improved.

Optionally, if the service packet that is of the target service flow and that is received by the network device includes in-situ flow detection information, the method may further include: performing in-situ flow detection on the target service flow based on the in-situ flow detection information, to obtain an in-situ flow detection result; and sending the in-situ flow detection result and the target application-aware identifier to the controller, where the target application-aware identifier is the first application-aware identifier, or the second application-aware identifier that is of the target service flow and that is obtained by the network device.

Optionally, the method may further include: receiving a sending policy that is of the target service flow and that is sent by the controller, where the sending policy indicates to report the in-situ flow detection result of the target service flow. Correspondingly, a process of sending the in-situ flow detection result and the target application-aware identifier to the controller may include: sending the in-situ flow detection result and the target application-aware identifier to the controller based on the indication of the sending policy.

Optionally, a process of sending the in-situ flow detection result and the target application-aware identifier to the controller may include: sending the in-situ flow detection result, the target application-aware identifier, and a corresponding in-situ flow detection flow identifier to the controller. The in-situ flow detection flow identifier may indicate a monitored data flow in the target service flow. Therefore, the controller may know a correspondence between the target application-aware identifier and the in-situ flow detection flow identifier, so that the controller analyzes transmission performance of at least one data flow included in the target service flow.

According to a third aspect, a controller is provided, and the controller includes:
  a generation module, configured to obtain, based on a user requirement of a target service flow, a correspondence between a first application-aware identifier of the target service flow and a first network service required for transmitting the target service flow; and
  a sending module, configured to send the correspondence to a first network device, where the correspondence is used by the first network device to determine, based on the first application-aware identifier, the first network service used to forward a service packet of the target service flow.

Optionally, the correspondence includes an identifier of the first network service, and the identifier of the first network service includes: a binding segment identifier and/or an identifier of a network slice.

Optionally, the first application-aware identifier includes at least one of a user identifier and an application identifier.

Optionally, the first application-aware identifier further includes at least one of a flow identifier, an SLA level, or a service requirement.

Optionally, the sending module is further configured to send an identifier generation rule to the first network device, so that the first network device generates a second application-aware identifier of the target service flow according to the identifier generation rule, and the second application-aware identifier is used to match the first application-aware identifier to determine the first network service.

Optionally, the sending module is further configured to send the first application-aware identifier of the target service flow to a second network device, where the first application-aware identifier is used by the second network device to encapsulate the application-aware identifier of the target service flow in the service packet of the target service flow if the second network device determines that the received service flow is the target service flow.

Optionally, the controller may further include: an obtaining module, configured to obtain the user requirement of the target service flow through a northbound interface.

Optionally, the controller may further include:
  a receiving module, configured to receive an in-situ flow detection result and a target application-aware identifier that are sent by a third network device, where the target application-aware identifier is an application-aware identifier of a service flow to which the in-situ flow detection result belongs, and the target application-aware identifier is the first application-aware identifier, or the second application-aware identifier that is of the target service flow and that is generated by the network device; and
  an analysis module, configured to analyze transmission performance of the target service flow based on the in-situ flow detection result and the target application-aware identifier.

Optionally, the controller may further include:
  a display module, configured to display a performance indicator of the target service flow based on a target granularity, where the performance indicator indicates the transmission performance of the target service flow; and the target granularity is a granularity indicated by at least one identifier in the target application-aware identifier.

Optionally, the generation module is further configured to: determine, based on the transmission performance of the target service flow, that the first network service does not meet the user requirement of the target service flow; and determine that a network service required for transmitting the target service flow is a second network service.

The sending module is further configured to send a correspondence between the first application-aware identifier and the second network service to the first network device.

Optionally, before that the receiving module receives an in-situ flow detection result and a target application-aware identifier that are sent by a third network device, the sending module is further configured to send a sending policy of the target service flow to the first network device and/or the third network device, where the sending policy indicates to report the in-situ flow detection result of the target service flow.

According to a fourth aspect, a network device is provided, and the network device includes:
  a receiving module, configured to receive a correspondence that is between a first application-aware identifier and a first network service and that is sent by a controller in a network, where the first application-aware identifier is generated by the controller based on a user requirement of a service flow; and
  the sending module is configured to: if the received target service flow is a service flow indicated by the first application-aware identifier, forward a service packet of the target service flow by using the first network service and based on the correspondence.

Optionally, the network device may further include:

an obtaining module, configured to obtain a second application-aware identifier of the target service flow from the service packet of the target service flow; and a determining module, configured to: if the second application-aware identifier matches the first application-aware identifier, determine that the target service flow is the service flow indicated by the first application-aware identifier.

Optionally, the service packet received by the network device includes IFIT information, and the second application-aware identifier is encapsulated in a flow identifier field or a reserved field of the IFIT information.

Alternatively, the second application-aware identifier is encapsulated in a destination address field, an HBH, a DOH, or an SRH of the service packet.

Optionally, the second application-aware identifier is encapsulated in a binding segment identifier field of the SRH field.

Optionally, the receiving module may be further configured to receive an identifier generation rule sent by the controller.

The network device may further include:

a generation module, configured to generate a second application-aware identifier of the target service flow according to the identifier generation rule; and a determining module, configured to: if the second application-aware identifier matches the first application-aware identifier, determine that the target service flow is the service flow indicated by the first application-aware identifier.

Optionally, the service packet received by the network device includes IFIT information. The sending module may be configured to: encapsulate the target application-aware identifier in a flow identifier field or a reserved field of the IFIT information, and forward, by using the first network service, the service packet in which the target application-aware identifier is encapsulated.

Optionally, the network device may further include:

a detection module, configured to: if the service packet that is of the target service flow and that is received by the network device includes in-situ flow detection information, perform in-situ flow detection on the target service flow based on the in-situ flow detection information, to obtain an in-situ flow detection result.

The sending module is further configured to send the in-situ flow detection result and the target application-aware identifier to the controller, where the target application-aware identifier is the first application-aware identifier, or the second application-aware identifier that is of the target service flow and that is obtained by the network device.

Optionally, the receiving module may be further configured to receive a sending policy that is of the target service flow and that is sent by the controller, where the sending policy indicates to report the in-situ flow detection result of the target service flow.

The sending module may be configured to send the in-situ flow detection result and the target application-aware identifier to the controller based on the indication of the sending policy.

According to a fifth aspect, a packet forwarding method is provided, and the method includes: generating a first application-aware identifier of a target service flow based on a user requirement of the target service flow, and sending the first application-aware identifier. The first application-aware identifier is used by a network device to encapsulate a target application-aware identifier in a service packet of the target service flow, the target application-aware identifier is the first application-aware identifier or a second application-aware identifier matching the first application-aware identifier, the first application-aware identifier corresponds to a first network service, the first application-aware identifier is used by the network device to forward the service packet of the target service flow by using the corresponding first network service, and the first network service meets the user requirement of the target service flow.

The first application-aware identifier corresponds to the first network service, and is used by the network device to encapsulate the target application-aware identifier in the service packet of the target service flow. Therefore, it can be ensured that the network device that receives the service packet can forward the service packet related to an application by using the first network service corresponding to the specific application, so that flexibility of forwarding the service packet is effectively improved.

Optionally, a process of generating a first application-aware identifier of a target service flow based on a user requirement of the target service flow may include: A controller in a network generates the first application-aware identifier of the target service flow based on the obtained user requirement of the target service flow. Correspondingly, a process of sending the first application-aware identifier may include: the controller sends the first application-aware identifier to a second network device, so that the second network device encapsulates the target application-aware identifier in the service packet of the target service flow.

The second network device may be an application-aware edge device in an APN. After the application-aware edge device encapsulates the target application-aware identifier in the service packet of the target service flow, a downstream network device may determine, based on the target application-aware identifier, the first network service used to forward the target service flow.

Optionally, the method may further include: the controller obtains the user requirement of the target service flow through a northbound interface. For example, the controller may obtain, through the northbound interface of the controller, the user requirement that is of the target service flow and that is sent by a frontend.

Optionally, the method may further include: the controller determines, based on the user requirement of the target service flow, a first network service required for transmitting the target service flow, and sends a correspondence between the first application-aware identifier and the first network service to a first network device, where the correspondence is used by the first network device to determine, based on the first application-aware identifier, the first network service used to forward the service packet of the target service flow.

The first network device may be a headend network device (also referred to as a head node) of the first network service. For example, the first network device is a head node of a forwarding path, or a head node of a network slice. It should be understood that the first network device and the second network device may be a same network device, or may be different network devices.

The controller may establish and deliver the correspondence between the application-aware identifier of the service flow and the network service, so that the first network device can directly forward the service packet of the service flow based on the correspondence. Therefore, flexibility of forwarding the service packet is effectively improved.

Optionally, the method may further include: the controller receives an in-situ flow detection result and a target application-aware identifier that are sent by a third network device; and analyzes transmission performance of the target service flow based on the in-situ flow detection result and the target application-aware identifier.

The third network device may be a node on an in-situ flow detection path of the target service flow, for example, may be an ingress node, a forwarding node (which may also be referred to as an intermediate node), or an egress node on an in-situ flow detection path. The target application-aware identifier may be the first application-aware identifier, or may be the second application-aware identifier that is of the target service flow and that is generated by the network device.

When reporting the in-situ flow detection result of the target service flow to the controller, the third network device may also report the target application-aware identifier of the target service flow. Therefore, the controller can further detect and analyze the transmission performance of the service flow by using a granularity indicated by at least one identifier in the target application-aware identifier, so that flexibility of detecting and analyzing the transmission performance of the service flow is effectively improved.

Optionally, the method may further include: the controller displays a performance indicator of the target service flow based on a target granularity, where the performance indicator indicates the transmission performance of the target service flow; and the target granularity is a granularity indicated by at least one identifier in the target application-aware identifier.

The target application-aware identifier may include one or more identifiers, and the controller displays the performance indicator based on the granularity indicated by the at least one identifier. Therefore, refined display of the performance indicator can be implemented, and the display granularity can also be flexibly adjusted.

Optionally, a process in which the controller receives an in-situ flow detection result and a target application-aware identifier that are sent by a third network device may include: the controller receives the in-situ flow detection result, the target application-aware identifier, and a corresponding in-situ flow detection flow identifier that are sent by the third network device. Correspondingly, a process in which the controller analyzes transmission performance of the target service flow based on the in-situ flow detection result and the target application-aware identifier may include: The controller determines, based on a correspondence between the target application-aware identifier and the in-situ flow detection flow identifier, at least one data flow included in the target service flow; and further analyzes, based on the in-situ flow detection result, transmission performance of the at least one data flow included in the target service flow.

The controller may determine, based on the correspondence between the target application-aware identifier and the in-situ flow detection flow identifier, the at least one monitored data flow included in the target service flow, and may further analyze the transmission performance of the target service flow based on the transmission performance of the at least one data flow.

Optionally, the method may further include: the controller determines, based on the transmission performance of the target service flow, that the first network service does not meet the user requirement of the target service flow; further determines that a network service required for transmitting the target service flow is a second network service; and further sends a correspondence between the first application-aware identifier and the second network service to the first network device.

The controller can update, in time based on the detected transmission performance of the target service flow, the network service required for transmitting the target service flow. Therefore, it can be ensured that the updated network service can meet the transmission performance of the target service flow, so that reliable transmission of the target service flow is ensured.

Optionally, before that the controller receives an in-situ flow detection result and a target application-aware identifier that are sent by a third network device, the method may further include: the controller sends a sending policy of the target service flow to the second network device and/or the third network device, where the sending policy indicates to report the in-situ flow detection result of the target service flow.

The controller may deliver the sending policy, so that the network device reports only the in-situ flow detection result of a key service flow. Therefore, a reporting granularity of the in-situ flow detection result is flexibly adjusted, and data processing pressure of the controller is also effectively reduced.

Optionally, a process of generating a first application-aware identifier of a target service flow based on a user requirement of the target service flow may include: a second network device generates the first application-aware identifier of the target service flow based on the user requirement that is of the target service flow and that is sent by a controller. Correspondingly, a process of sending the first application-aware identifier may include: The second network device encapsulates the first application-aware identifier in a service packet of the target service flow, and forwards the service packet in which the first application-aware identifier is encapsulated.

The second network device may be an application-aware edge device in an APN. After the application-aware edge device generates the first application-aware identifier, and encapsulates the first application-aware identifier in the service packet of the target service flow, a downstream network device may determine, based on the first application-aware identifier, a first network service used to forward the target service flow.

Optionally, if the service packet that is of the target service flow and that is received by the second network device includes in-situ flow detection information, the method may further include: The second network device performs in-situ flow detection on the target service flow based on the in-situ flow detection information, to obtain an in-situ flow detection result, and sends the in-situ flow detection result and the first application-aware identifier to the controller.

Optionally, the method may further include: the second network device receives a sending policy that is of the target service flow and that is sent by the controller, where the sending policy indicates to report the in-situ flow detection result of the target service flow. A process in which the second network device sends the in-situ flow detection result and the first application-aware identifier to the controller may include: The second network device sends the in-situ flow detection result and the first application-aware identifier to the controller based on the indication of the sending policy.

Optionally, a process in which the second network device sends the in-situ flow detection result and the first application-aware identifier to the controller may include: the second network device sends the in-situ flow detection result, the first application-aware identifier, and a corresponding in-situ flow detection flow identifier to the controller.

Optionally, a process in which the second network device encapsulates the first application-aware identifier in a service packet of the target service flow may include: the second network device encapsulates the first application-aware identifier in a flow identifier field or a reserved field of IFIT information of the service packet.

Alternatively, the second network device encapsulates the first application-aware identifier in a destination address field, an HBH, a DOH, or an SRH of the service packet. For example, the second network device may encapsulate the first application-aware identifier in a BSID field of the SRH field.

Optionally, the user requirement of the target service flow includes one or more of the following requirements: a requirement for a specified forwarding path, a requirement for a specified network slice, and a requirement for a performance indicator of transmission performance.

Optionally, the target application-aware identifier includes at least one of a user identifier and an application identifier. The user identifier indicates a user to which the target service flow belongs, and the application identifier indicates an application to which the target service flow belongs.

Optionally, the target application-aware identifier may further include at least one of a flow identifier, an SLA level, or a service requirement. The service requirement may be a requirement for performance indicators such as a latency and a packet loss rate, and the flow identifier in the first application-aware identifier is also referred to as a session identifier (session ID).

According to a sixth aspect, a packet forwarding method is provided, applied to a network device, and the method includes: receiving a first application-aware identifier sent by a controller, where the first application-aware identifier is generated based on a user requirement of a service flow, the first application-aware identifier corresponds to a first network service, and the first network service meets the user requirement of the service flow; and if the received target service flow is a service flow indicated by the first application-aware identifier, encapsulating a target application-aware identifier in a service packet of the target service flow, and forwarding the service packet in which the target application-aware identifier is encapsulated. The target application-aware identifier is the first application-aware identifier, or a second application-aware identifier matching the first application-aware identifier.

Optionally, if the service packet that is of the target service flow and that is received by the network device includes in-situ flow detection information, the method may further include: performing in-situ flow detection on the target service flow based on the in-situ flow detection information, to obtain an in-situ flow detection result, and sending the in-situ flow detection result and the target application-aware identifier to the controller.

Optionally, a process of sending the in-situ flow detection result and the target application-aware identifier to the controller may include: sending the in-situ flow detection result, the target application-aware identifier, and a corresponding in-situ flow detection flow identifier to the controller.

Optionally, a process of encapsulating a target application-aware identifier in a service packet of the target service flow may include: encapsulating the target application-aware identifier in a flow identifier field or a reserved field of IFIT information of the service packet; or encapsulating the target application-aware identifier in a destination address field, an HBH, a DOH, or an SRH of the service packet.

Optionally, a process of receiving a first application-aware identifier sent by a controller may include: receiving a correspondence that is between the first application-aware identifier and the first network service and that is sent by the controller. Correspondingly, a process of forwarding the service packet in which the target application-aware identifier is encapsulated may include: forwarding, by using the first network service, the service packet in which the target application-aware identifier is encapsulated.

According to a seventh aspect, a packet forwarding apparatus is provided, and the apparatus includes:
 a generation module, configured to generate a first application-aware identifier of a target service flow based on a user requirement of the target service flow, where the first application-aware identifier is used by a network device to encapsulate a target application-aware identifier in a service packet of the target service flow, the target application-aware identifier is the first application-aware identifier or a second application-aware identifier matching the first application-aware identifier, the first application-aware identifier corresponds to a first network service, and the first network service meets the user requirement of the target service flow; and
 a sending module, configured to send the first application-aware identifier, where the first application-aware identifier is used by the network device to forward the service packet of the target service flow by using the first network service.

Optionally, the packet forwarding apparatus may be used in a controller in a network, and the generation module is configured to generate the first application-aware identifier of the target service flow based on the obtained user requirement of the target service flow.

The sending module is configured to send the first application-aware identifier to a second network device, so that the second network device encapsulates the target application-aware identifier in the service packet of the target service flow.

Optionally, the apparatus further includes: an obtaining module, configured to obtain the user requirement of the target service flow through a northbound interface.

Optionally, the generation module is further configured to determine, based on the user requirement of the target service flow, the first network service required for transmitting the target service flow.

The sending module is further configured to send a correspondence between the first application-aware identifier and the first network service to a first network device, where the correspondence is used by the first network device to determine, based on the first application-aware identifier, the first network service used to forward the service packet of the target service flow.

Optionally, the apparatus may further include:
 a receiving module, configured to receive an in-situ flow detection result and a target application-aware identifier that are sent by a third network device, where the target application-aware identifier is an application-aware identifier of a service flow to which the in-situ flow detection result belongs, and the target application-aware identifier is the first application-aware identifier, or the second application-aware identifier that is of the target service flow and that is generated by the network device; and an analysis module, configured to analyze transmission performance of the target service flow based on the in-situ flow detection result and the target application-aware identifier.

Optionally, the apparatus may further include:

a display module, configured to display a performance indicator of the target service flow based on a target granularity, where the performance indicator indicates the transmission performance of the target service flow; and the target granularity is a granularity indicated by at least one identifier in the target application-aware identifier.

Optionally, the receiving module may be configured to receive the in-situ flow detection result, the target application-aware identifier, and a corresponding in-situ flow detection flow identifier that are sent by a third network device.

The analysis module may be configured to: determine, based on a correspondence between the target application-aware identifier and the in-situ flow detection flow identifier, at least one data flow included in the target service flow; and analyze, based on the in-situ flow detection result, transmission performance of the at least one data flow included in the target service flow.

Optionally, the generation module may be further configured to: determine, based on the transmission performance of the target service flow, that the first network service does not meet the user requirement of the target service flow; and further determine that a network service required for transmitting the target service flow is a second network service.

The sending module may be further configured to send a correspondence between the first application-aware identifier and the second network service to the first network device.

Optionally, before that the receiving module receives an in-situ flow detection result and a target application-aware identifier that are sent by a third network device, the sending module may be further configured to send a sending policy of the target service flow to the second network device and/or the third network device, where the sending policy indicates to report the in-situ flow detection result of the target service flow.

Optionally, the packet forwarding apparatus may be used in the second network device, and the generation module may be configured to generate the first application-aware identifier of the target service flow based on the user requirement that is of the target service flow and that is sent by a controller.

The sending module may be configured to: encapsulate the first application-aware identifier in a service packet of the target service flow, and forward the service packet in which the first application-aware identifier is encapsulated.

Optionally, if the service packet that is of the target service flow and that is received by the second network device includes in-situ flow detection information, the apparatus may further include:

a detection module, configured to perform in-situ flow detection on the target service flow based on the in-situ flow detection information, to obtain an in-situ flow detection result.

The sending module may be further configured to send the in-situ flow detection result and the first application-aware identifier to the controller.

Optionally, the apparatus may further include:

a receiving module, configured to receive a sending policy that is of the target service flow and that is sent by the controller, where the sending policy indicates to report the in-situ flow detection result of the target service flow.

The sending module may be configured to send the in-situ flow detection result and the first application-aware identifier to the controller based on the indication of the sending policy.

Optionally, the sending module may be configured to send the in-situ flow detection result, the first application-aware identifier, and a corresponding in-situ flow detection flow identifier to the controller.

Optionally, the sending module may be configured to: encapsulate the first application-aware identifier in a flow identifier field or a reserved field of IFIT information of the service packet; or encapsulate the first application-aware identifier in a destination address field, an HBH, a DOH, or an SRH of the service packet.

Optionally, the user requirement of the target service flow includes one or more of the following requirements: a requirement for a specified forwarding path, a requirement for a specified network slice, and a requirement for a performance indicator of transmission performance.

Optionally, the target application-aware identifier includes at least one of a user identifier and an application identifier.

According to an eighth aspect, a network device is provided, and the network device includes:

a receiving module, configured to receive a first application-aware identifier sent by a controller, where the first application-aware identifier is generated based on a user requirement of a service flow, the first application-aware identifier corresponds to a first network service, and the first network service meets the user requirement of the service flow;

an encapsulation module, configured to: if the received target service flow is a service flow indicated by the first application-aware identifier, encapsulate a target application-aware identifier in a service packet of the target service flow, where the target application-aware identifier is the first application-aware identifier or a second application-aware identifier matching the first application-aware identifier; and a sending module, configured to forward the service packet in which the target application-aware identifier is encapsulated.

Optionally, if the service packet that is of the target service flow and that is received by the network device includes in-situ flow detection information, the network device may further include:

a detection module, configured to perform in-situ flow detection on the target service flow based on the in-situ flow detection information, to obtain an in-situ flow detection result.

The sending module is further configured to send the in-situ flow detection result and the target application-aware identifier to the controller.

Optionally, the sending module may be configured to send the in-situ flow detection result, the target application-aware identifier, and a corresponding in-situ flow detection flow identifier to the controller.

Optionally, the encapsulation module may be configured to: encapsulate the target application-aware identifier in a flow identifier field or a reserved field of IFIT information of the service packet; or encapsulate the target application-aware identifier in a destination address field, an HBH, a DOH, or an SRH of the service packet.

Optionally, the receiving module may be configured to receive a correspondence that is between the first application-aware identifier and the first network service and that is sent by the controller. Correspondingly, the sending module may be configured to forward, by using the first network service, the service packet in which the target application-aware identifier is encapsulated.

According to a ninth aspect, a method for detecting performance of a service flow is provided, applied to a network device, where the method includes: performing, based on in-situ flow detection information in a service packet, in-situ flow detection on a target service flow to which the service packet belongs, to obtain an in-situ flow detection result; and sending the in-situ flow detection result and a target application-aware identifier of the target service flow to a controller in a network. The target application-aware identifier is generated based on a user requirement of the target service flow, and the in-situ flow detection result and the target application-aware identifier are used by the controller to analyze transmission performance of the target service flow.

When reporting the in-situ flow detection result of the target service flow to the controller, the network device may also report the target application-aware identifier of the target service flow. Therefore, the controller can further detect and analyze the transmission performance of the service flow by using a granularity indicated by at least one identifier in the target application-aware identifier, so that flexibility of detecting and analyzing the transmission performance of the service flow is effectively improved.

Optionally, the target application-aware identifier is encapsulated in the service packet. For example, the network device may directly obtain the target application-aware identifier from the service packet received by the network device, and the target application-aware identifier may indicate a user and/or an application to which the target service flow belongs.

The target application-aware identifier may be encapsulated by an upstream node (for example, an application-aware edge device) of the network device, or may be encapsulated by the application to which the target service flow belongs.

Optionally, if the in-situ flow detection information is IFIT information, the target application-aware identifier is encapsulated in a flow identifier field or a reserved field of the IFIT information.

The target application-aware identifier is encapsulated in the IFIT information, so that the network device can synchronously obtain the target application-aware identifier when reading the IFIT information to perform in-situ flow detection.

Alternatively, the target application-aware identifier may be encapsulated in a destination address field, an HBH, a DOH, or an SRH of the service packet. For example, the target application-aware identifier may be encapsulated in a BSID field of the SRH field.

Optionally, the method may further include: receiving a correspondence that is between a first application-aware identifier and a first network service and that is sent by a controller, where the first application-aware identifier is generated by the controller based on a user requirement of a service flow; and if the target service flow is a service flow indicated by the first application-aware identifier, forwarding a service packet of the target service flow by using the first network service and based on the correspondence.

The controller may establish and deliver the correspondence between the application-aware identifier of the service flow and the network service, so that the network device can directly forward the service packet of the service flow based on the correspondence. Therefore, flexibility of forwarding the service packet is effectively improved.

Optionally, the method may further include: receiving an identifier generation rule sent by the controller; and generating a second application-aware identifier of the target service flow according to the identifier generation rule. The target application-aware identifier is the second application-aware identifier or the first application-aware identifier that is of the target service flow and that is sent by the controller.

In a scenario in which the application-aware identifier is not encapsulated in the received service packet, the network device may further generate a second application-aware identifier. The second application-aware identifier as a target application-aware identifier may be reported to the controller. Alternatively, if further receiving the first application-aware identifier that is of the target service flow and that is delivered by the controller, the network device may further determine that the second application-aware identifier matches the first application-aware identifier, and report the first application-aware identifier as the target application-aware identifier to the controller.

Optionally, the in-situ flow detection information is IFIT information. The method may further include: encapsulating the target application-aware identifier in a flow identifier field or a reserved field of the IFIT information, and forwarding the service packet in which the target application-aware identifier is encapsulated. Therefore, a downstream node of the network device can directly obtain, from the service packet, and report the target application-aware identifier.

Optionally, the method may further include: receiving a sending policy that is of the target service flow and that is sent by the controller, where the sending policy indicates to report the in-situ flow detection result of the target service flow. Correspondingly, a process in which the network device sends the in-situ flow detection result and a target application-aware identifier of the target service flow to a controller may include: sending the in-situ flow detection result and the target application-aware identifier of the target service flow to the controller based on the indication of the sending policy.

The controller may deliver a sending policy of a key service flow (including the target service flow) to the network device, so that the network device reports only an in-situ flow detection result of the key service flow, and does not need to report an in-situ flow detection result of a non-key service flow. Therefore, a reporting granularity of the in-situ flow detection result is flexibly adjusted, and data processing pressure of the controller is also effectively reduced.

Optionally, a process of sending the in-situ flow detection result and a target application-aware identifier of the target service flow to a controller in a network may include: sending the in-situ flow detection result, the target application-aware identifier of the target service flow, and a corresponding in-situ flow detection flow identifier to the controller in the network.

The in-situ flow detection flow identifier may indicate a monitored data flow in the target service flow. Therefore, the controller may know a correspondence between the target application-aware identifier and the in-situ flow detection flow identifier, so that the controller analyzes transmission performance of at least one data flow included in the target service flow.

Optionally, the target application-aware identifier includes at least one of a user identifier and an application identifier. The user identifier indicates a user to which the target service flow belongs, and the application identifier indicates an application to which the target service flow belongs.

Optionally, the target application-aware identifier may further include at least one of a flow identifier, an SLA level, or a service requirement. The service requirement may be a requirement for performance indicators such as a latency and a packet loss rate, and the flow identifier in the second application-aware identifier is also referred to as a session identifier (session ID).

According to a tenth aspect, a method for detecting performance of a service flow is provided, applied to a controller in a network, and the method includes: receiving an in-situ flow detection result and a target application-aware identifier that are sent by a third network device, where the in-situ flow detection result is obtained by the third network device by performing in-situ flow detection on a target service flow, and the target application-aware identifier is generated based on a user requirement of the target service flow; and analyzing transmission performance of the target service flow based on the in-situ flow detection result and the target application-aware identifier.

The third network device may be a node on an in-situ flow detection path of the target service flow, for example, may be an ingress node, a forwarding node (which may also be referred to as an intermediate node), or an egress node on an in-situ flow detection path.

Optionally, the target application-aware identifier includes at least one of a user identifier and an application identifier. The method further includes: displaying a performance indicator of the target service flow based on a target granularity, where the performance indicator indicates the transmission performance of the target service flow; and the target granularity is a granularity indicated by the at least one identifier in the target application-aware identifier.

The target application-aware identifier may include one or more identifiers, and the controller displays the performance indicator based on the granularity indicated by the at least one identifier. Therefore, refined display of the performance indicator can be implemented, and the display granularity can also be flexibly adjusted.

Optionally, before the receiving an in-situ flow detection result and a target application-aware identifier that are sent by a third network device, the method may further include: sending a sending policy of the target service flow to the third network device, where the sending policy indicates to report the in-situ flow detection result of the target service flow.

Optionally, a process of receiving an in-situ flow detection result and a target application-aware identifier that are sent by a third network device may include: receiving the in-situ flow detection result, the target application-aware identifier, and a corresponding in-situ flow detection flow identifier that are sent by the third network device. Correspondingly, a process of analyzing transmission performance of the target service flow based on the in-situ flow detection result and the target application-aware identifier may include: determining, based on a correspondence between the target application-aware identifier and the in-situ flow detection flow identifier, at least one data flow included in the target service flow; and analyzing, based on the in-situ flow detection result, transmission performance of the at least one data flow included in the target service flow.

The controller may determine, based on the correspondence between the target application-aware identifier and the in-situ flow detection flow identifier, the at least one monitored data flow included in the target service flow, and may further analyze the transmission performance of the target service flow based on the transmission performance of the at least one data flow.

Optionally, the method may further include: obtaining, based on a user requirement of a target service flow, a correspondence between a first application-aware identifier of the target service flow and a first network service required for transmitting the target service flow; and sending the correspondence to a first network device, where the correspondence is used by the first network device to determine, based on the first application-aware identifier, the first network service used to forward a service packet of the target service flow. The target application-aware identifier is the first application-aware identifier or a second application-aware identifier that is of the target service flow and that is generated by the network device.

The first network device may be a headend network device (also referred to as a head node) of the first network service. For example, the first network device is a head node of a forwarding path, or a head node of a network slice. It should be understood that the first network device and the third network device may be a same network device, or may be different network devices.

Optionally, the method may further include: determining, based on the transmission performance of the target service flow, that the first network service does not meet the user requirement of the target service flow; determining that a network service required for transmitting the target service flow is a second network service; and sending a correspondence between the first application-aware identifier and the second network service to the first network device.

The controller can update, in time based on the detected transmission performance of the target service flow, the network service required for transmitting the target service flow. Therefore, it can be ensured that the updated network service can meet the transmission performance of the target service flow, so that reliable transmission of the target service flow is ensured.

Optionally, the method may further include: sending the first application-aware identifier of the target service flow to a second network device. The first application-aware identifier is used by the second network device to encapsulate the application-aware identifier of the target service flow in the service packet of the target service flow if the second network device determines that the received service flow is the target service flow.

The third network device may be an application-aware edge device in an APN. After the application-aware edge device encapsulates the application-aware identifier of the target service flow in the service packet of the target service flow, a downstream network device may determine, based on the application-aware identifier, the network service used to forward the target service flow, or may report the application-aware identifier of the target service flow when reporting an in-situ flow detection result of the target service flow.

Optionally, the method may further include: obtaining the user requirement of the target service flow through a northbound interface. For example, the controller may obtain, through the northbound interface of the controller, the user requirement that is of the target service flow and that is sent by a frontend.

Optionally, the user requirement of the target service flow includes one or more of the following requirements: a requirement for a specified forwarding path, a requirement for a specified network slice, and a requirement for a performance indicator of transmission performance.

According to an eleventh aspect, a network device is provided. The network device includes:
 a detection module, configured to perform, based on in-situ flow detection information in a service packet, in-situ flow detection on a target service flow to which the service packet belongs, to obtain an in-situ flow detection result; and
 a sending module, configured to send the in-situ flow detection result and a target application-aware identifier of the target service flow to a controller in a network. The target application-aware identifier is generated based on a user requirement of the target service flow, and the in-situ flow detection result and the target application-aware identifier are used by the controller to analyze transmission performance of the target service flow.

Optionally, the target application-aware identifier is encapsulated in the service packet, and the target application-aware identifier may indicate a user and/or an application to which the target service flow belongs.

Optionally, if the in-situ flow detection information is IFIT information, the target application-aware identifier is encapsulated in a flow identifier field or a reserved field of the IFIT information.

Optionally, the network device may further include:
 a receiving module, configured to receive a correspondence that is between a first application-aware identifier and a first network service and that is sent by a controller, where the first application-aware identifier is generated by the controller based on a user requirement of a service flow.

The sending module is further configured to: if the target service flow is a service flow indicated by the first application-aware identifier, forward a service packet of the target service flow by using the first network service and based on the correspondence.

Optionally, the receiving module may be further configured to receive an identifier generation rule sent by the controller.

The network device may further include: a generation module, configured to generate a second application-aware identifier of the target service flow according to the identifier generation rule.

The target application-aware identifier is the second application-aware identifier or the first application-aware identifier that is of the target service flow and that is sent by the controller.

Optionally, the in-situ flow detection information is IFIT information. The network device may further include:
 an encapsulation module, configured to encapsulate the target application-aware identifier in a flow identifier field or a reserved field of the IFIT information.

The sending module is further configured to forward the service packet in which the target application-aware identifier is encapsulated.

Optionally, the receiving module may be further configured to receive a sending policy that is of the target service flow and that is sent by the controller, where the sending policy indicates to report the in-situ flow detection result of the target service flow.

The sending module is configured to send the in-situ flow detection result and the target application-aware identifier of the target service flow to the controller based on the indication of the sending policy.

Optionally, the sending module may be configured to send the in-situ flow detection result, the target application-aware identifier of the target service flow, and a corresponding in-situ flow detection flow identifier to the controller in the network.

Optionally, the target application-aware identifier includes at least one of a user identifier and an application identifier.

According to a twelfth aspect, a controller is provided, where the controller includes:
 a receiving module, configured to receive an in-situ flow detection result and a target application-aware identifier that are sent by a third network device, where the in-situ flow detection result is obtained by the third network device by performing in-situ flow detection on a target service flow, and the target application-aware identifier is generated based on a user requirement of the target service flow; and
 an analysis module, configured to analyze transmission performance of the target service flow based on the in-situ flow detection result and the target application-aware identifier.

Optionally, the target application-aware identifier includes at least one of a user identifier and an application identifier. The controller further includes:
 a display module, configured to display a performance indicator of the target service flow based on a target granularity, where the performance indicator indicates the transmission performance of the target service flow; and the target granularity is a granularity indicated by at least one identifier in the target application-aware identifier.

Optionally, the controller further includes:
 a sending module, configured to send a sending policy of the target service flow to the third network device before the receiving module receives the in-situ flow detection result and the target application-aware identifier that are sent by the third network device, where the sending policy indicates to report the in-situ flow detection result of the target service flow.

Optionally, the receiving module may be configured to receive the in-situ flow detection result, the target application-aware identifier, and a corresponding in-situ flow detection flow identifier that are sent by a third network device. Correspondingly, the analysis module may be configured to: determine, based on a correspondence between the target application-aware identifier and the in-situ flow detection flow identifier, at least one data flow included in the target service flow; and analyze, based on the in-situ flow detection result, transmission performance of the at least one data flow included in the target service flow.

Optionally, the controller further includes:
 a generation module, configured to obtain, based on a user requirement of a target service flow, a correspondence between a first application-aware identifier of the target service flow and a first network service required for transmitting the target service flow.

The sending module is further configured to send the correspondence to a first network device, where the correspondence is used by the first network device to determine, based on the first application-aware identifier, the first network service used to forward a service packet of the target service flow.

The target application-aware identifier is the first application-aware identifier or a second application-aware identifier that is of the target service flow and that is generated by the network device.

Optionally, the generation module is further configured to: determine, based on the transmission performance of the target service flow, that the first network service does not meet the user requirement of the target service flow; and determine that a network service required for transmitting the target service flow is a second network service.

The sending module is further configured to send a correspondence between the first application-aware identifier and the second network service to the first network device.

Optionally, the sending module is further configured to send the first application-aware identifier of the target service flow to a second network device.

Optionally, the controller further includes:
an obtaining module, configured to obtain the user requirement of the target service flow through a northbound interface.

According to a thirteenth aspect, a controller is provided. The controller may include a memory, a processor, and a computer program that is stored in the memory and that can be run on the processor. When executing the computer program, the processor implements the method that is applied to the controller and that is provided in any one of the foregoing aspects.

According to a fourteenth aspect, a network device is provided. The network device may include a memory, a processor, and a computer program that is stored in the memory and that can be run on the processor. When executing the computer program, the processor implements the method that is applied to the network device and that is provided in any one of the foregoing aspects.

According to a fifteenth aspect, a network device is provided. The network device may include: a main control board and an interface board, and the interface board may be configured to implement the method that is applied to the network device and that is provided in any one of the foregoing aspects.

According to a sixteenth aspect, a network device is provided. The network device includes: a main control board and an interface board. The main control board includes: a first processor and a first memory. The interface board includes: a second processor, a second memory, and an interface card. The main control board is coupled to the interface board. The second memory may be configured to store program code, and the second processor is configured to invoke the program code in the second memory, to trigger the interface card to perform the following operations: receiving a correspondence that is between a first application-aware identifier and a first network service and that is sent by a controller in a network, where the first application-aware identifier is generated by the controller based on a user requirement of a service flow; and if the received target service flow is a service flow indicated by the first application-aware identifier, forwarding a service packet of the target service flow by using the first network service and based on the correspondence.

According to a seventeenth aspect, a network device is provided. The network device includes: a main control board and an interface board. The main control board includes: a first processor and a first memory. The interface board includes: a second processor, a second memory, and an interface card. The main control board is coupled to the interface board. The first memory may be configured to store program code, and the first processor is configured to invoke the program code in the first memory to perform the following operations: generating a first application-aware identifier of a target service flow based on a user requirement that is of the target service flow and that is sent by a controller; and encapsulating a target application-aware identifier in a service packet of the target service flow. The second memory may be configured to store program code, and the second processor is configured to invoke the program code in the second memory, to trigger the interface card to perform the following operations: forwarding the service packet in which the target application-aware identifier is encapsulated. The target application-aware identifier is the first application-aware identifier, or a second application-aware identifier matching the first application-aware identifier, the first application-aware identifier corresponds to a first network service, and the first network service meets the user requirement of the target service flow.

Alternatively, the second processor is configured to invoke the program code in the second memory, to trigger the interface card to perform the following operations: receiving a first application-aware identifier sent by a controller, where the first application-aware identifier is generated based on a user requirement of a service flow, the first application-aware identifier corresponds to a first network service, and the first network service meets the user requirement of the service flow; and if the received target service flow is a service flow indicated by the first application-aware identifier, encapsulating a target application-aware identifier in a service packet of the target service flow, and forwarding the service packet in which the target application-aware identifier is encapsulated. The target application-aware identifier is the first application-aware identifier, or a second application-aware identifier matching the first application-aware identifier.

According to an eighteenth aspect, a network device is provided. The network device includes: a main control board and an interface board. The main control board includes: a first processor and a first memory. The interface board includes: a second processor, a second memory, and an interface card. The main control board is coupled to the interface board. The first memory may be configured to store program code, and the first processor is configured to invoke the program code in the first memory to perform the following operations: performing, based on in-situ flow detection information in a service packet, in-situ flow detection on a target service flow to which the service packet belongs, to obtain an in-situ flow detection result.

The second memory may be configured to store program code, and the second processor is configured to invoke the program code in the second memory, to trigger the interface card to perform the following operations: sending the in-situ flow detection result and a target application-aware identifier of the target service flow to a controller in a network. The target application-aware identifier is generated based on a user requirement of the target service flow, and the in-situ flow detection result and the target application-aware identifier are used by the controller to analyze transmission performance of the target service flow.

According to a nineteenth aspect, a non-transitory computer-readable storage medium is provided. The non-transitory computer-readable storage medium stores instructions, and the instructions are executed by a processor to implement the method provided in any one of the foregoing aspects.

According to a twentieth aspect, a computer program product including instructions is provided. When the computer program product runs on a computer, the computer is enabled to perform the method provided in any one of the foregoing aspects.

According to a twenty-first aspect, a communication network is provided, where the communication network may include: a controller and at least one network device. The controller may implement the method that is applied to the controller and that is provided in any one of the foregoing aspects, and the network device may implement the method that is applied to the network device and that is provided in any one of the foregoing aspects.

According to a twenty-second aspect, a chip is provided. The chip may be configured to implement the method provided in any one of the foregoing aspects.

Thus, the embodiments include a packet forwarding method and apparatus, and a communication network, where a controller may obtain a correspondence between an application-aware identifier of a service flow and a network service required for transmitting the service flow, and deliver the correspondence to a network device. Further, when identifying the service flow as a service flow indicated by the application-aware identifier, the network device may directly forward a packet of the service flow by using the corresponding network service. The controller may establish and deliver the correspondence between the application-aware identifier of the service flow and the network service, so that the network device can directly forward the service packet of the service flow based on the correspondence. Therefore, flexibility of forwarding the service packet is effectively improved.

DETAILED DESCRIPTION OF EMBODIMENTS

With reference to the accompanying drawings, the following describes in detail a packet forwarding method and apparatus, and a communication network that are provided in embodiments.

Figure 1:
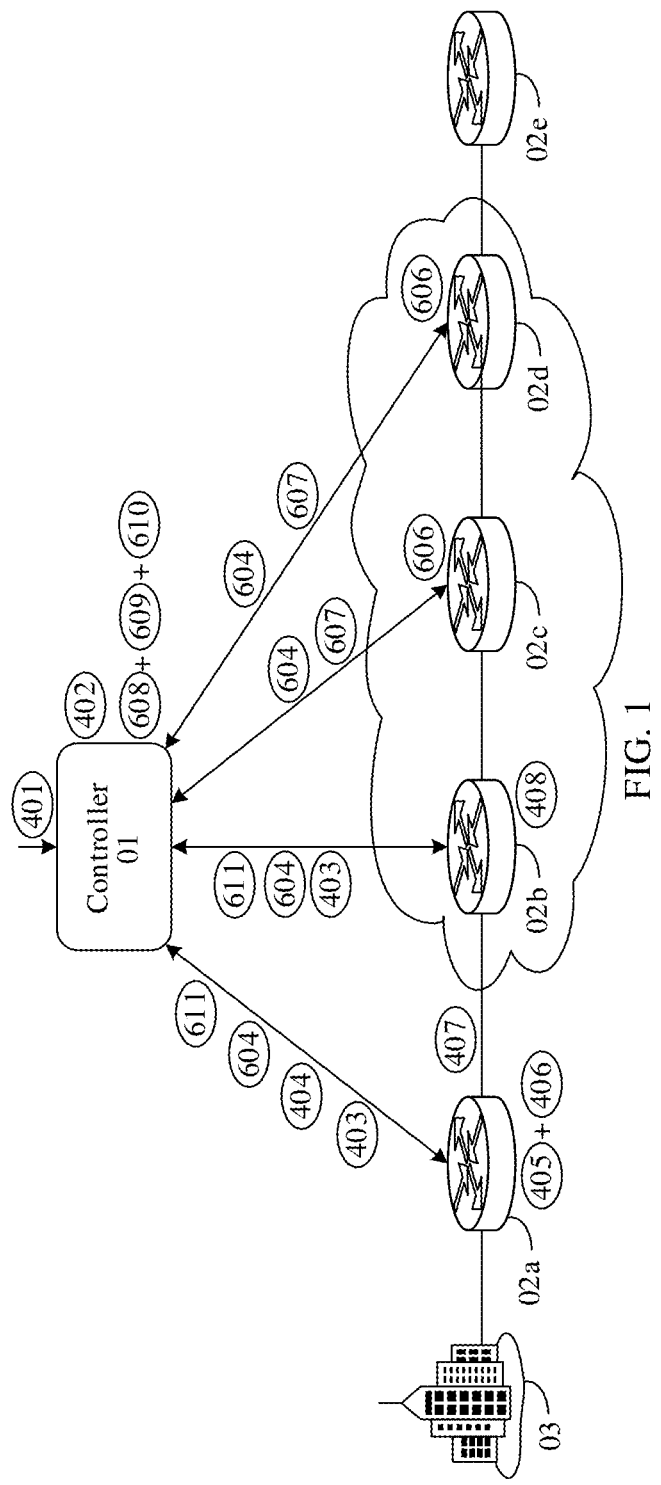
FIG. 1 is a schematic diagram of a structure of a communication network according to an embodiment.

FIG. 1 is a schematic diagram of a structure of a communication network according to an embodiment. As shown in FIG. 1, the communication network may include a controller 01 and a plurality of network devices. For example, FIG. 1 schematically shows a total of five network devices 02a to 02e. A communication connection is established between the controller 01 and at least one network device, and a communication connection is established between the plurality of network devices.

The controller 01 may be a network controller, for example, may be a software-defined networking (software-defined networking, SDN) controller, a network control engine (network control engine, NCE), or a path computation element server (path computation element server, PCE server). In addition, the controller 01 may be a server, a server cluster including several servers, or a cloud computing service center. Each network device may be a device that has a packet forwarding function, such as a router or a switch, and each network device may also be referred to as a node.

Optionally, the plurality of network devices may include a provider (provider, P) device, a provider edge (provider edge, PE) device, a broadband remote access server (broadband remote access server, BRAS), customer premises equipment (customer premises equipment, CPE), and the like.

Refer to FIG. 1. The at least one network device (for example, the PE device or the CPE) in the communication network may be further connected to a user terminal 03, and is configured to provide a network access service for the user terminal 03. The user terminal 03 may also be referred to as a host or user equipment. An application (application, APP) is installed in the user terminal 03, and the plurality of network devices may forward a service flow of the APP.

It may be understood that the communication network provided in this embodiment may be an APN. For example, the APN may be a network based on internet protocol version 6 (IPv6), and is also referred to as an APN 6. Alternatively, the APN may be a network based on SRv6, a multi-protocol label switching (MPLS) technology, or a virtual extensible local area network (VXLAN). SRv6 is an IPv6-based segment routing (SR) forwarding technology.

Figure 2:
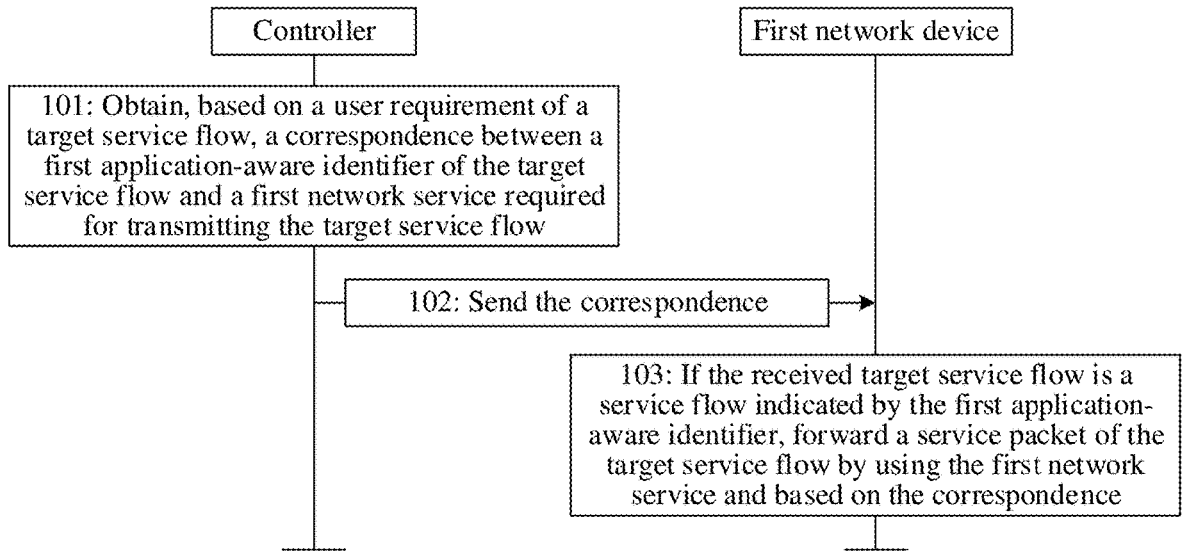
FIG. 2 is a flowchart of a packet forwarding method according to an embodiment.

An embodiment provides a packet forwarding method. The method may be applied to the communication network shown in FIG. 1. Refer to FIG. 2. The method includes the following steps.

Step 101: A controller obtains, based on a user requirement of a target service flow, a correspondence between a first application-aware identifier of the target service flow and a first network service required for transmitting the target service flow.

The user requirement of the target service flow is a requirement of the target service flow for performance of the network service. For example, the user requirement may include one or more of the following requirements: a requirement for a specified forwarding path, a requirement for a specified network slice, and a requirement for a performance indicator of transmission performance. The performance indicator of the transmission performance may include a latency, a bandwidth, a packet loss rate, and the like. In addition, the user requirement of the target service flow may further include information about a user and/or an application to which the target service flow belongs.

Figure 3:
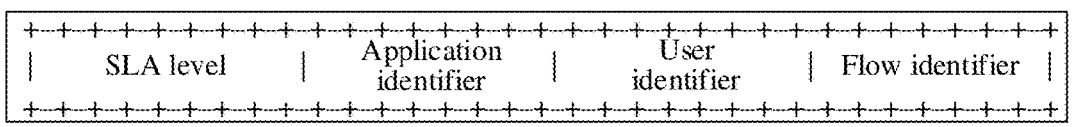
FIG. 3 is a schematic diagram of a data structure of an application-aware identifier according to an embodiment.

The controller may generate the first application-aware identifier of the target service flow based on the user requirement of the target service flow. FIG. 3 is a schematic diagram of a structure of an application-aware identifier according to an embodiment. As shown in FIG. 3, the first application-aware identifier includes at least one of a user identifier (user ID) and an application identifier (APP ID). The user identifier is used to identify a user to which the target service flow belongs. The application identifier is used to identify an application to which the target service flow belongs. It should be understood that the user to which the target service flow belongs may be a user, or may be a user group. The application to which the target service flow belongs may be an application, or may be an application group.

Still refer to FIG. 3. The first application-aware identifier may further include at least one of a flow identifier (flow ID) and an SLA level. The flow identifier (also referred to as a session ID) is used to identify a specified flow (such as a specific session) in the application to which the target service flow belongs. The SLA level is used to identify a service level of the user to which the target service flow belongs. The service level may include levels such as gold, silver, and bronze, or the service level may be further distinguished by using different colors (colors).

The controller may further obtain, through calculation based on a user requirement of the target service flow, a first network service that can meet the user requirement. The first network service may include a network slice and/or a forwarding path. For example, the first network service may include a specified network slice or a specified forwarding path in the user requirement. The forwarding path may be an SRv6 path.

Step 102: The controller sends the correspondence to the first network device.

The correspondence is used by the first network device to determine, based on the first application-aware identifier, the first network service used to forward a service packet of the target service flow. The first network device may be a headend network device (also referred to as a head node) of the first network service. For example, the first network device is a head node of a forwarding path, or a head node of a network slice.

Optionally, the first application-aware identifier and an identifier of the first network service corresponding to the first application-aware identifier are recorded in the correspondence. If the first network service includes the network slice, the identifier of the first network service includes an identifier of the network slice. If the first network service includes the forwarding path, the identifier of the first network service includes an identifier of the forwarding path. The identifier of the forwarding path may be a BSID of the forwarding path, or may be a BSID of an SR policy to which the forwarding path belongs.

Step 103: If the target service flow received by the first network device is a service flow indicated by the first application-aware identifier, forward the service packet of the target service flow by using the first network service and based on the correspondence.

The first network device may identify the service flow received by the first network device. If identifying the target service flow received by the first network device as the service flow indicated by the first application-aware identifier, the first network device may forward the service packet of the target service flow by using the first network service and based on the correspondence delivered by the controller. For example, assuming that the first network service includes the SRv6 path, the first network device may forward the service packet of the target service flow through the SRv6 path.

In a possible example, the first network device may identify the service flow by using an application-aware identifier encapsulated in the service packet of the target service flow. If detecting that the application-aware identifier encapsulated in the service packet of the target service flow matches the first application-aware identifier, the first network device may determine that the target service flow is the service flow indicated by the first application-aware identifier.

In another possible example, the first network device may further identify, in a manner of parsing the packet or analyze a traffic feature, whether the target service flow is the service flow indicated by the first application-aware identifier. For example, the first network device may identify the target service flow by analyzing 4-tuple information, 5-tuple information, or 7-tuple information of the service packet. Alternatively, the first network device may further analyze the service packet of the target service flow by using a deep packet inspection (DPI) technology, to identify whether the target service flow is the service flow indicated by the first application-aware identifier. Alternatively, the first network device may further analyze the traffic feature of the target service flow by using an artificial intelligence (AI) model, to identify whether the target service flow is the service flow indicated by the first application-aware identifier. The AI model may be delivered by the controller to the first network device.

It may be understood that, in this embodiment, the application-aware identifier of the service flow may also be referred to as an APN identifier or an APN ID.

In conclusion, this embodiment provides a packet forwarding method, where a controller may obtain a correspondence between an application-aware identifier of a service flow and a network service required for transmitting the service flow, and deliver the correspondence to a network device. Further, when identifying the service flow as a service flow indicated by the application-aware identifier, the network device may directly forward a packet of the service flow by using the corresponding network service. The controller may establish and deliver the correspondence between the application-aware identifier of the service flow and the network service, so that the network device can directly forward the service packet of the service flow based on the correspondence. Therefore, flexibility of forwarding the service packet is effectively improved.

Figure 4:
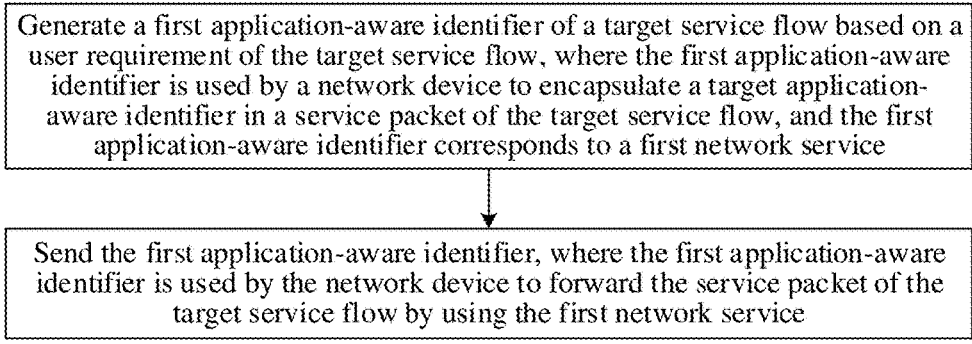
FIG. 4 is a flowchart of another packet forwarding method according to an embodiment.

An embodiment provides another packet forwarding method. The method may be applied to the communication network shown in FIG. 1, and may be applied to a controller or any network device in the communication network. Refer to FIG. 4. The method includes the following steps.

Step 201: Generate a first application-aware identifier of a target service flow based on a user requirement of the target service flow, where the first application-aware identifier is used by a network device to encapsulate a target application-aware identifier in a service packet of the target service flow, and the first application-aware identifier corresponds to a first network service.

The first network service meets the user requirement of the target service flow. The target application-aware identifier may be the first application-aware identifier, or a second application-aware identifier matching the first application-aware identifier. In this embodiment, the controller may generate the first application-aware identifier of the target service flow based on the user requirement that is of the target service flow and that is obtained by the controller. Alternatively, the second network device may generate the first application-aware identifier of the target service flow based on the user requirement that is of the target service flow and that is delivered by the controller.

The user requirement of the target service flow is a requirement of the target service flow for performance of the network service, and the user requirement of the target service flow may further include information about a user and/or an application to which the target service flow belongs. The first network service may include a network slice and/or a forwarding path. For a structure of the first application-aware identifier, refer to FIG. 3.

Step 202: Send the first application-aware identifier, where the first application-aware identifier is used by the network device to forward the service packet of the target service flow by using the first network service.

If the first application-aware identifier is generated by the controller, the controller may send the first application-aware identifier to a second network device. The second network device is an application-aware edge device. If determining that the received target service flow is a service flow indicated by the first application-aware identifier, the second network device may encapsulate the target application-aware identifier in the service packet of the target service flow. The target application-aware identifier may be the first application-aware identifier, or may be a second application-aware identifier that is of a target service flow and that is generated by the second network device, and the second application-aware identifier matches the first application-aware identifier. Therefore, a downstream network device of the second network device may determine, based on the target application-aware identifier, a first network service used to forward the target service flow, and further forward the service packet of the target service flow by using the first network service.

If the first application-aware identifier is generated by the second network device, the second network device may encapsulate the first application-aware identifier in the service packet of the target service flow, and forward, to a downstream network device, the service packet in which the first application-aware identifier is encapsulated. The downstream network device may further determine, based on the first application-aware identifier, a first network service used to forward the target service flow, and forward the service packet of the target service flow by using the first network service.

In conclusion, this embodiment provides a packet forwarding method. In the method, a first application-aware identifier can be generated based on a user requirement of a target service flow. The first application-aware identifier corresponds to a first network service, and is used by a network device to encapsulate a target application-aware identifier in a service packet of the target service flow. Therefore, it can be ensured that the network device that receives the service packet can forward the service packet by using the corresponding first network service, so that flexibility of forwarding the service packet is effectively improved.

Figure 5:
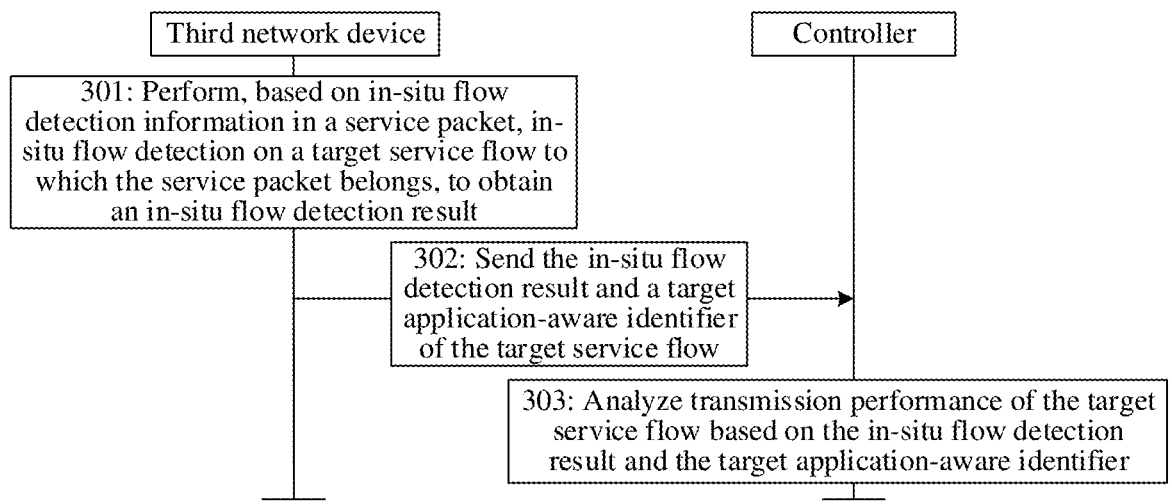
FIG. 5 is a flowchart of a method for detecting performance of a service flow according to an embodiment.

An embodiment provides a method for detecting performance of a service flow. The method may be applied to the communication network shown in FIG. 1. Refer to FIG. 5. The method includes the following steps.

Step 301: A third network device performs, based on in-situ flow detection information in a service packet, in-situ flow detection on a target service flow to which the service packet belongs, to obtain an in-situ flow detection result.

In this embodiment, the third network device may be a node on a forwarding path of the target service flow, and the third network device may be an ingress node, a transit node, or an egress node on an in-situ flow detection path of the target service flow. The in-situ flow detection result may include a measurement result of a performance indicator such as a latency and/or a packet loss rate of the target service flow.

It may be understood that the in-situ flow detection information may be encapsulated in the service packet by an ingress node on the in-situ flow detection path of the target service flow, and the ingress node may be an upstream node of the third network device, or may be the third network device. If the third network device is the ingress node, the third network device may encapsulate the in-situ flow detection information in the service packet of the target service flow, and may perform in-situ flow detection on the target service flow based on the in-situ flow detection information, to obtain the in-situ flow detection result.

Step 302: The third network device sends the in-situ flow detection result and a target application-aware identifier of the target service flow to a controller in the network.

The target application-aware identifier is generated based on a user requirement of the target service flow, and the in-situ flow detection result and the target application-aware identifier are used by the controller to analyze transmission performance of the target service flow. The user requirement of the target service flow is a requirement of the target service flow for the performance of the network service. For a structure of the target application-aware identifier, refer to FIG. 3.

In a possible implementation, the target application-aware identifier is encapsulated in the service packet that is of the target service flow and that is received by the third network device. The target application-aware identifier may be encapsulated in the service packet by the upstream node (for example, an application-aware edge device) of the third network device or an application to which the target service flow belongs. In addition, the target application-aware identifier may be a second application-aware identifier generated by the upstream node or the application to which the target service flow belongs, or may be a first application-aware identifier delivered by the controller.

In another possible implementation, the target application-aware identifier of the target service flow is not encapsulated in the service packet that is of the target service flow and that is received by the third network device. In this implementation, the third network device may generate the second application-aware identifier of the target service flow based on an identifier generation rule delivered by the controller. Correspondingly, the target application-aware identifier is the second application-aware identifier generated by the third network device.

Step 303: The controller analyzes the transmission performance of the target service flow based on the in-situ flow detection result and the target application-aware identifier.

After receiving the in-situ flow detection result and the target application-aware identifier that are sent by the third network device, the controller can analyze the transmission performance of the target service flow by using a granularity indicated by at least one identifier in the target application-aware identifier. The transmission performance may be represented by using a performance indicator such as a packet loss rate and/or a latency.

It may be understood that the controller may receive in-situ flow detection results and application-aware identifiers that are of different service flows and that are reported by different network devices, and the controller may determine an in-situ flow detection result of a same service flow based on the application-aware identifier, and may further analyze transmission performance of the service flow based on one or more in-situ flow detection results of the same service flow.

In conclusion, this embodiment provides a method for detecting performance of a service flow. When reporting an in-situ flow detection result of a target service flow to the controller, the network device may also report a target application-aware identifier of the target service flow. Further, the controller can detect and analyze transmission performance of the service flow by using a granularity indicated by at least one identifier in the target application-aware identifier, so that flexibility of detecting and analyzing the transmission performance of the service flow is effectively improved.

Figure 6:
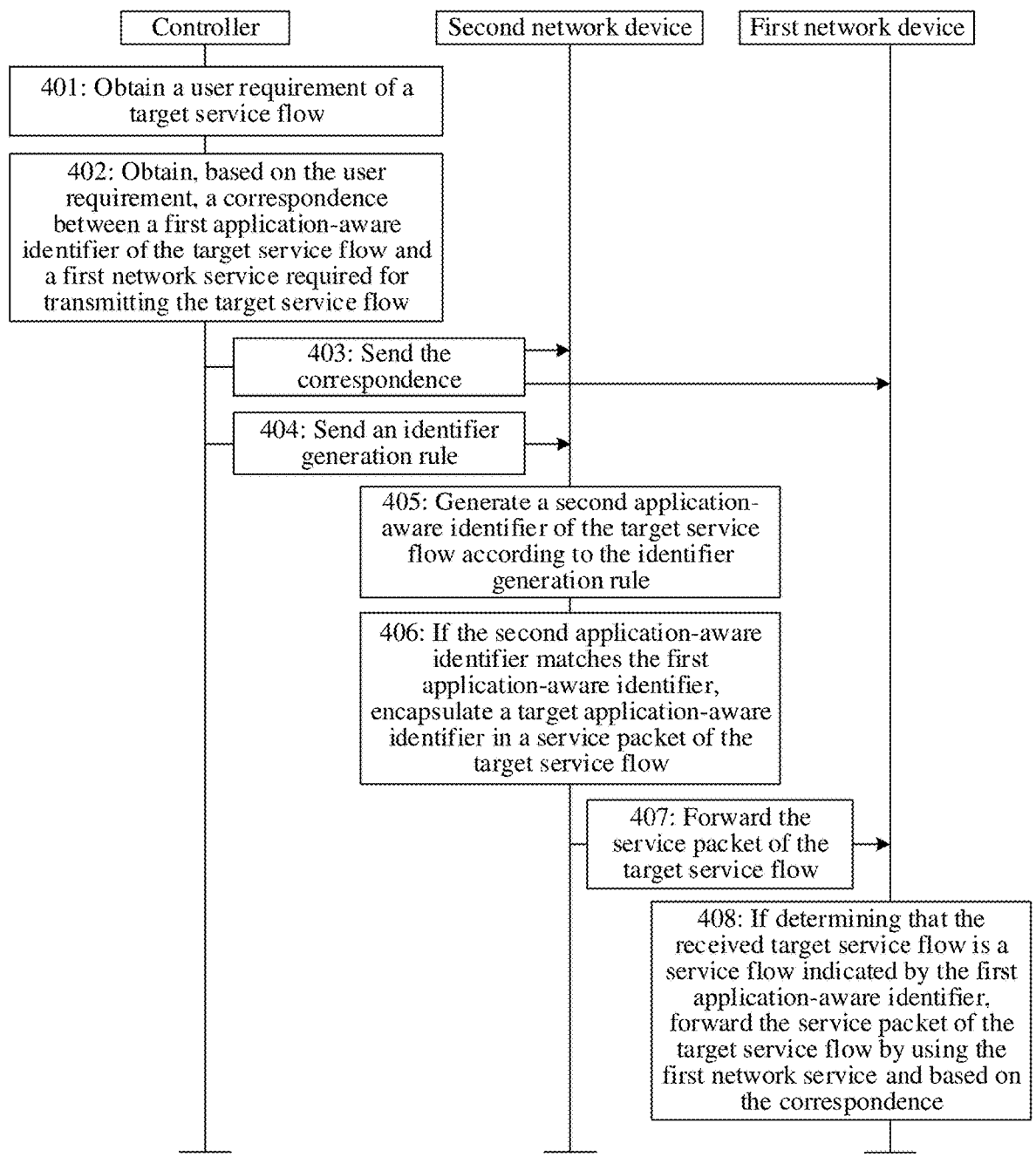
FIG. 6 is a flowchart of still another packet forwarding method according to an embodiment.

FIG. 6 is a flowchart of still another packet forwarding method according to an embodiment. The method may be applied to the communication network shown in FIG. 1. Refer to FIG. 6. The method includes the following steps.

Step 401: A controller obtains a user requirement of a target service flow.

The user requirement of the target service flow is a requirement of the target service flow for performance of a network service. For example, the user requirement may include one or more of the following requirements: a requirement for a specified forwarding path, a requirement for a specified network slice, and a requirement for a performance indicator of transmission performance. The performance indicator of the transmission performance may include a latency, a bandwidth, a packet loss rate, and the like. In addition, the user requirement of the target service flow may further include information about a user and/or an application to which the target service flow belongs.

In this embodiment, the controller may obtain the user requirement of the target service flow through a northbound interface (northbound interface) of the controller. For example, the northbound interface of the controller may be connected to another device, so that the controller obtains the user requirement that is of the target service flow and that is sent by the device. For example, the device connected to the northbound interface of the controller includes, but is not limited to, a frontend, a portal, an orchestrator, an operation support system (OSS), or a business support system (BSS).

Step 402: The controller obtains, based on the user requirement, a correspondence between a first application-aware identifier of the target service flow and a first network service required for transmitting the target service flow.

The controller may generate the first application-aware identifier of the target service flow based on the user requirement of the target service flow. As shown in FIG. 3, the first application-aware identifier includes at least one of a user identifier and an application identifier. The user identifier is used to identify a user to which the target service flow belongs. The application identifier is used to identify an application to which the target service flow belongs. For example, assuming that the application to which the target service flow belongs is an enterprise application, the user identifier may be an identifier of an enterprise.

Still refer to FIG. 3. The first application-aware identifier may further include at least one of a flow identifier and an SLA level. The flow identifier is used to identify a specified data flow in the application to which the target service flow belongs. The SLA level is used to identify a service level of the user to which the target service flow belongs. The service level may include levels such as gold, silver, and bronze, or the service level may be further distinguished by using different colors.

The controller may further obtain, through calculation based on the user requirement of the target service flow, the first network service that can meet the user requirement, to obtain a correspondence between the first application-aware identifier and the first network service. The first network service may include a network slice and/or a forwarding path.

It may be understood that the first application-aware identifier and an identifier of the first network service corresponding to the first application-aware identifier may be recorded in the correspondence. In other words, the correspondence may be a correspondence between the first application-aware identifier and the identifier of the first network service. If the first network service includes the network slice, the identifier of the first network service may include an identifier of the network slice. If the first network service includes the forwarding path, the identifier of the first network service may include an identifier of the forwarding path. The forwarding path may be an SRv6 path, and the identifier of the forwarding path may be a BSID of the forwarding path, or may be a BSID of an SR policy to which the forwarding path belongs.

Step 403: The controller separately sends the correspondence to the first network device and a second network device.

The first network device may be a headend network device (also referred to as a head node) of the first network service. For example, the first network device is a head node of a forwarding path, or a head node of a network slice. The correspondence is used by the first network device to determine, based on the first application-aware identifier, the first network service used to forward a service packet of the target service flow.

The second network device may be an application-aware edge device (app-aware edge device) in an ANP network, and the second network device may be a BRAS, a PE device, a CPE, an egress gateway (for example, an egress gateway of a campus), or the like. The first application-aware identifier in the correspondence is used by the second network device to: encapsulate, if the second network device determines that the received service flow is the target service flow, an application-aware identifier of the target service flow in the service packet of the target service flow, for example, encapsulate the first application-aware identifier.

For example, refer to FIG. 1. It is assumed that a network device 02a is the application-aware edge device (such as the second network device). If a network device 02b is a headend network device (such as the first network device) of the first network service, the controller 01 may separately deliver the correspondence to the network device 02a and the network device 02b. The correspondence delivered by the controller 01 may be shown in Table 1. Refer to Table 1. In the correspondence, an identifier of a first network service corresponding to a target service flow whose first application-aware identifier is an APN ID 1 is a BSID 1. That is, the first network service allocated by the controller 01 to the target service flow is an SRv6 path indicated by the BSID 1. An identifier of a first network service corresponding to a target service flow whose first application-aware identifier is an APN ID 3 is a slice-ID 1. That is, the first network service allocated by the controller 01 to the target service flow is a network slice indicated by the slice-ID 1.

TABLE 1

| First application-aware identifier | Identifier of first network service |
|---|---|
| APN ID 1 | BSID 1 |
| APN ID 2 | BSID 2 |
| APN ID 3 | Slice-ID 1 |

It may be understood that the first network device and the second network device may be a same network device. That is, the application-aware edge device is the headend network device of the first network service. In this scenario, the controller may deliver the correspondence to only one network device. For example, refer to FIG. 7. It is assumed that a network device 02a is the application-aware edge device (such as the second network device). If the network device 02a is also the headend network device (such as the first network device) of the first network service, the controller 01 may deliver the correspondence to only the network device 02a.

It may be further understood that, in a scenario in which the first network device and the second network device are different network devices, the controller may deliver the first application-aware identifier to only the second network device (for example, the network device 02a shown in FIG. 1), and does not need to deliver the correspondence.

Step 404: The controller sends an identifier generation rule to the second network device.

The identifier generation rule may be a rule for generating an application-aware identifier of a service flow based on feature information of the service flow. The identifier generation rule is used by the second network device to generate a second application-aware identifier of the target service flow, and the second application-aware identifier is used to match the first application-aware identifier generated by the controller, so that the second network device determines whether the target service flow received by the second network device is a service flow indicated by the first application-aware identifier.

For example, as shown in FIG. 1, the controller 01 may deliver the identifier generation rule to the network device 02a.

Step 405: The second network device generates the second application-aware identifier of the target service flow according to the identifier generation rule.

After receiving the identifier generation rule delivered by the controller, the second network device may generate, according to the identifier generation rule, the application-aware identifier for the service flow received by the second network device. In this embodiment, the second network device may obtain feature information of the target service flow received by the second network device, and process the feature information according to the identifier generation rule, to generate the second application-aware identifier of the target service flow. The feature information may include information such as 4-tuple information, 5-tuple information, or 7-tuple information of the target service flow, or may further include traffic feature information (for example, a packet interval) of the target service flow, or may further include information obtained based on a DPI technology or an application identification technology.

For example, assuming that the identifier generation rule is an AI model, the second network device may input the traffic feature information of the target service flow into the AI model, to obtain the second application-aware identifier that is of the target service flow and that is output by the AI model.

It may be understood that the second application-aware identifier has a same structure as the first application-aware identifier. If the first application-aware identifier includes an application identifier, the second network device may identify, based on the application identification technology, an application to which the target service flow belongs, and may further generate, according to the identifier generation rule, the application identifier of the application to which the target service flow belongs. If the first application-aware identifier includes a user identifier, the second network device may determine, based on information such as a virtual local area network (VLAN) or an interface of the target service flow, a user to which the target service flow belongs, and may further generate, according to the identifier generation rule, the user identifier of the user to which the target service flow belongs.

Step 406: If the second application-aware identifier matches the first application-aware identifier, the second network device encapsulates a target application-aware identifier in the service packet of the target service flow.

In this embodiment, if detecting that the second application-aware identifier that is of the target service flow and that is generated by the second network device matches the first application-aware identifier delivered by the controller, the second network device may determine that the target service flow is the service flow indicated by the first application-aware identifier. Because the second application-aware identifier is generated by the second network device according to the identifier generation rule delivered by the controller, it can be ensured that the second application-aware identifier accurately matches the first application-aware identifier delivered by the controller, that is, reliability of identifying the target service flow by the second network device is ensured.

As the application-aware edge device, the second network device may further encapsulate the target application-aware identifier in the service packet of the target service flow. The target application-aware identifier may be the first application-aware identifier delivered by the controller, or may be the second application-aware identifier generated by the second network device.

Optionally, the second network device may encapsulate the target application-aware identifier in a destination address field, an HBH, a DOH, or an SRH of the service packet. For example, the SRH includes a BSID field, and the second network device may encapsulate the target application-aware identifier in the BSID field.

Alternatively, if the service packet received by the second network device includes in-situ flow detection information, the second network device may alternatively encapsulate the target application-aware identifier in the in-situ flow detection information. For example, if the in-situ flow detection information is IFIT information, the second network device may encapsulate the target application-aware identifier in a flow identifier field or a reserved field of the IFIT information.

For example, as shown in FIG. 1, the network device 02*a* may generate a second application-aware identifier of the target service flow according to the identifier generation rule delivered by the controller 01. It is assumed that the second application-aware identifier generated by the network device 02*a* is an APN ID 1. Because the second application-aware identifier is the same as the first application-aware identifier APN ID 1 in the correspondence shown in Table 1, the network device 02*a* may encapsulate the APN ID 1 in the service packet of the target service flow. For example, the network device 02*a* may encapsulate the APN ID 1 in a BSID field of the service packet.

In a possible example, a structure of the target application-aware identifier encapsulated in the service packet may be shown in FIG. 3. Refer to FIG. 3. The target application-aware identifier may include: an SLA level, an application identifier, a user identifier, and a flow identifier.

Figures 7, 8, 9:
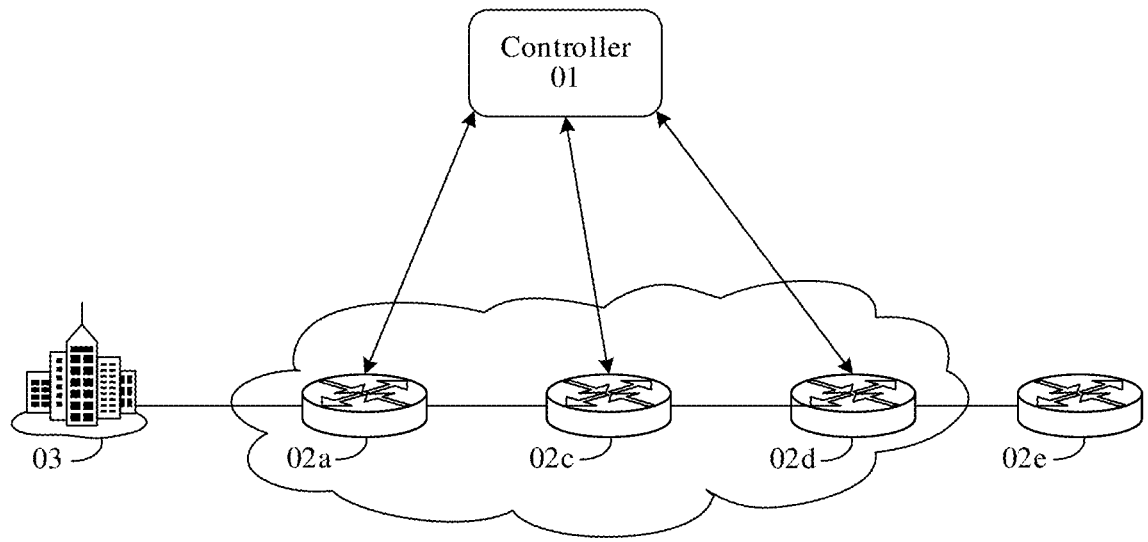
FIG. 7 is a schematic diagram of a structure of another communication network according to an embodiment.
FIG. 8 is a schematic diagram of a data structure of another application-aware identifier according to an embodiment.
FIG. 9 is a schematic diagram of a data structure of still another application-aware identifier according to an embodiment.

In another possible example, a structure of the target application-aware identifier encapsulated in the service packet may be shown in FIG. 8. Refer to FIG. 8. The target application-aware identifier may include: an SLA level, an application identifier, a user identifier, a flow identifier, and an arguments field. The arguments field may indicate a service requirement of the target service flow, for example, may indicate an upper limit of a latency and/or an upper limit of a packet loss rate of the target service flow.

In still another possible example, the target application-aware identifier may be encapsulated in an arguments field of a segment identifier (segment ID, SID) in an SRv6 packet. As shown in FIG. 9, a SID in an SRv6 packet includes: a locator address (locator address) field, a function identifier (function ID) field, and an arguments field. The target application-aware identifier shown in FIG. 3 or FIG. 8 may be encapsulated in the arguments field.

For related explanations of the application-aware identifier, refer to a draft: draft-li-6man-app-aware-ipv6-network-03. Related content in the draft may be incorporated in embodiments by reference.

It may be understood that the second application-aware identifier generated by the second network device matches the first application-aware identifier delivered by the controller may mean that the second application-aware identifier is the same as the first application-aware identifier, or may mean that the second application-aware identifier is different from the first application-aware identifier, but there is a specific correspondence between the two.

The correspondence between the application-aware identifiers may be delivered by the controller. That is, the controller may deliver the identifier generation rule and the correspondence between the application-aware identifiers, to ensure that the application-aware identifiers generated by the controller and the network device are synchronized with each other. For example, the controller may deliver a correspondence between the first application-aware identifier and another application-aware identifier matching the first application-aware identifier to the second network device, and the second network device may determine, based on the correspondence delivered by the controller, whether the second application-aware identifier generated by the second network device matches the first application-aware identifier.

It may be further understood that if the second application-aware identifier generated by the second network device is different from the first application-aware identifier, the second network device may further report the correspondence between the second application-aware identifier and the first application-aware identifier to the controller, so that the controller can also know the application-aware identifier that is of the target service flow and that is generated by the network device. For example, for a service flow of a video conference APP, assuming that the first application-aware identifier generated by the controller is an APN 11, and the second application-aware identifier generated by the second network device is an APN 12, the second network device may report a correspondence between the APN 12 and the APN 11 to the controller.

Step 407: The second network device forwards the service packet of the target service flow to the first network device.

The second network device may forward, to the first network device, the service packet in which the target application-aware identifier is encapsulated. The first network device may be a headend network device of the first network service.

For example, refer to FIG. 1. The second network device 02*a* may forward, to the first network device 02*b*, the service packet in which the target application-aware identifier is encapsulated.

Step 408: If determining that the received target service flow is the service flow indicated by the first application-aware identifier, the first network device forwards the service packet of the target service flow by using the first network service and based on the correspondence.

The first network device may identify, based on the application-aware identifier encapsulated in the service packet of the service flow, the service flow received by the first network device. If detecting that the target application-aware identifier in the service packet of the target service flow matches the first application-aware identifier, the first network device may determine that the target service flow is the service flow indicated by the first application-aware identifier. Further, the first network device may forward the service packet of the target service flow by using the first network service and based on the correspondence delivered by the controller.

For example, refer to FIG. 1. Assuming that the target application-aware identifier that is encapsulated in the service packet of the target service flow and that is received by the network device 02*b* (such as the first network device) is the APN ID 1, the network device 02*b* may determine, based on the correspondence shown in Table 1, that the first network service allocated by the controller 01 to the target service flow is the SRv6 path indicated by the BSID 1. Therefore, the network device 02*b* may forward the service packet of the target service flow through the SRv6 path indicated by the BSID 1.

It may be understood that in a scenario in which the second network device and the first network device are different network devices, the controller may deliver the correspondence to only the first network device in step 403, and may delete step 404 to step 406 based on a situation. For example, the second network device does not need to identify the target service flow and encapsulate the target application-aware identifier. Correspondingly, the first network device may further identity, in a manner of parsing the packet or analyzing a traffic feature, whether the target service flow is the service flow indicated by the first application-aware identifier. Alternatively, when sending the target service flow, the application to which the target service flow belongs may encapsulate the application-aware identifier of the target service flow in the service packet, and the first network device may identify, based on the application-aware identifier encapsulated by the application to which the target service flow belongs, whether the target service flow received by the first network device is the service flow indicated by the first application-aware identifier.

It may be further understood that, in a scenario in which the second network device and the first network device are a same network device, step 407 may be deleted. Alternatively, step 404 and step 403 may be performed synchronously. For example, the controller may deliver the identifier generation rule while delivering the correspondence to the first network device (or the second network device). Alternatively, step 405 may be deleted based on a situation. For example, the first network device (or the second network device) may not need to generate the second application-aware identifier, but may identify, in a manner of parsing the packet or analyzing the traffic feature, whether the received service flow is the service flow indicated by the first application-aware identifier. Alternatively, step 406 may be deleted based on a situation. For example, the first network device (or the second network device) may not need to encapsulate the target application-aware identifier in the service packet of the target service flow.

In conclusion, this embodiment provides a packet forwarding method, where a controller may obtain a correspondence between an application-aware identifier of a service flow and a network service required for transmitting the service flow, and deliver the correspondence to a network device. Further, when identifying the service flow as a service flow indicated by the application-aware identifier, the network device may directly forward a packet of the service flow by using the corresponding network service. The controller may establish and deliver the correspondence between the application-aware identifier of the service flow and the network service, so that the network device can directly forward the service packet of the service flow based on the correspondence. Therefore, flexibility of forwarding the service packet is effectively improved.

Figure 10:
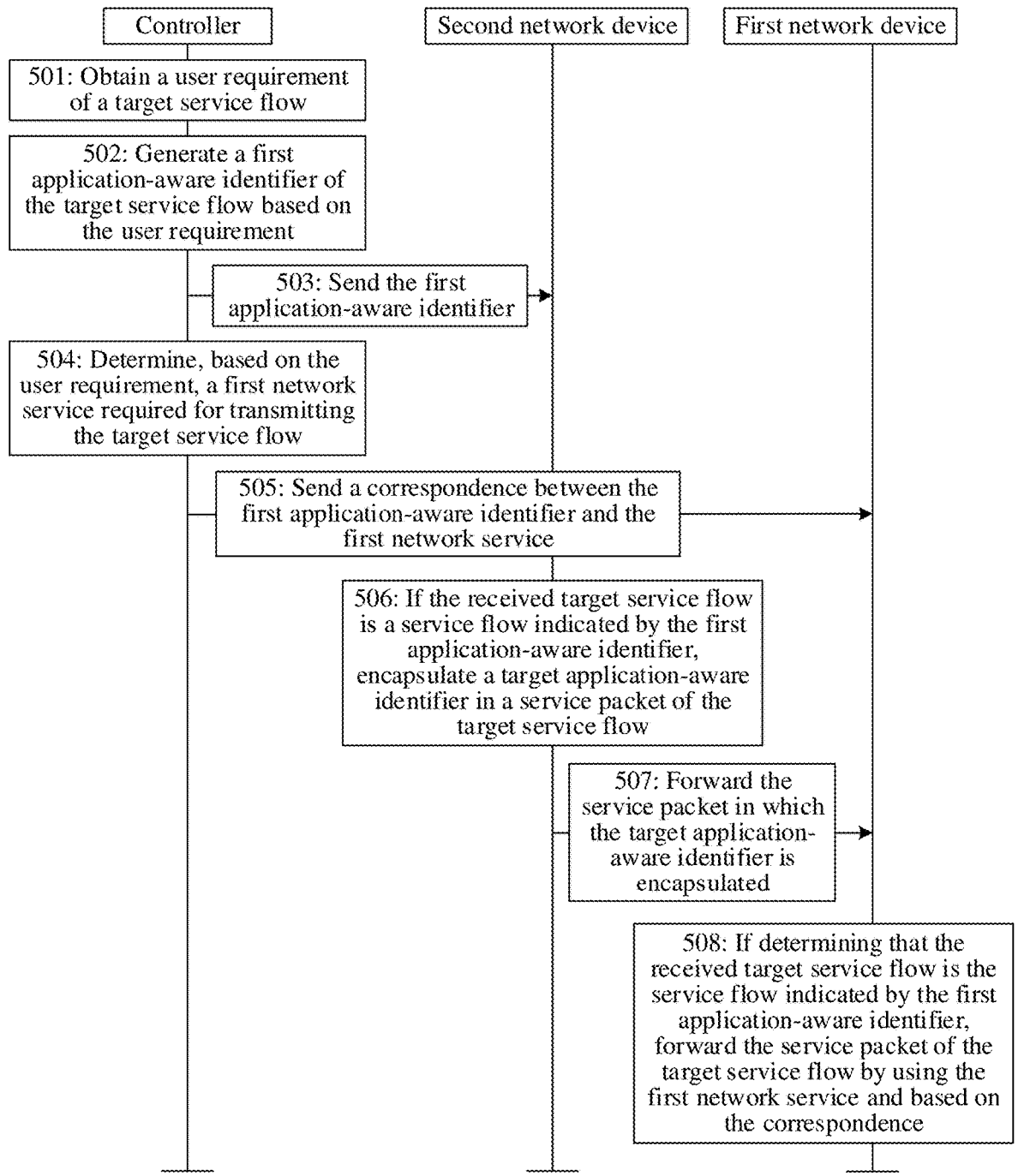
FIG. 10 is a flowchart of yet another packet forwarding method according to an embodiment.

FIG. 10 is a flowchart of yet another packet forwarding method according to an embodiment. The method may be applied to the communication network shown in FIG. 1 or FIG. 7. Refer to FIG. 10. The method includes the following steps.

Step 501: A controller obtains a user requirement of a target service flow.

In this embodiment, the controller may obtain the user requirement of the target service flow through a northbound interface. For example, the northbound interface of the controller may be connected to a frontend, so that the controller may obtain the user requirement that is of the target service flow and that is sent by the frontend. For an implementation process of step 501, refer to the related descriptions of step 401.

Step 502: The controller generates a first application-aware identifier of the target service flow based on the user requirement.

The first application-aware identifier is used to be encapsulated in a service packet of the target service flow, and the first application-aware identifier corresponds to a first network service, for example, corresponds to an identifier of the first network service. The first network service meets the user requirement of the target service flow. The first application-aware identifier includes at least one of a user identifier and an application identifier, and may further include at least one of a flow identifier and an SLA level. The first network service may include a forwarding path and/or a network slice. For an implementation process of step 502, refer to the related descriptions of step 402.

Step 503: The controller sends the first application-aware identifier to a second network device.

The second network device may be an application-aware edge device in an ANP network, and the second network device may be a BRAS, a PE device, a CPE, an egress gateway (for example, an egress gateway of a campus), or the like. The first application-aware identifier indicates a user and/or an application to which the target service flow belongs, and the first application-aware identifier is used by the second network device to encapsulate the first application-aware identifier in the service packet of the target service flow.

Step 504: The controller determines, based on the user requirement, the first network service required for transmitting the target service flow.

The controller may obtain, through calculation based on the user requirement of the target service flow, the first network service that can meet the user requirement. The first network service may include the network slice and/or the forwarding path. For an implementation process of step 504, refer to the related descriptions of step 402.

Step 505: The controller sends a correspondence between the first application-aware identifier and the first network service to a first network device.

The first network device may be a headend network device of the first network service. The correspondence is used by the first network device to determine, based on the first application-aware identifier, the first network service used to forward the service packet of the target service flow.

It may be understood that the first application-aware identifier and the identifier of the first network service corresponding to the first application-aware identifier may be recorded in the correspondence. In other words, the correspondence may be a correspondence between the first application-aware identifier and the identifier of the first network service. If the first network service includes the network slice, the identifier of the first network service may include an identifier of the network slice. If the first network service includes the forwarding path, the identifier of the first network service may include an identifier of the forwarding path. The forwarding path may be an SRv6 path, and the identifier of the forwarding path may be a BSID of the forwarding path, or may be a BSID of an SR policy to which the forwarding path belongs.

Step 506: If a target service flow received by the second network device is a service flow indicated by the first application-aware identifier, encapsulate a target application-aware identifier in the service packet of the target service flow.

The second network device may identify the service flow received by the second network device. If identifying the target service flow received by the second network device as the service flow indicated by the first application-aware identifier, the second network device may encapsulate the target application-aware identifier in the service packet of the target service flow. Therefore, a downstream network device (for example, the first network device) may determine, based on the target application-aware identifier, the first network service used to forward the service packet of the target service flow, and/or may also report the target application-aware identifier when reporting an in-situ flow detection result for the target service flow to the controller.

The target application-aware identifier may be the first application-aware identifier delivered by the controller, or may be a second application-aware identifier that is of the target service flow and that is generated by the second network device. For a process in which the second network device encapsulates the target application-aware identifier in the service packet, refer to the related descriptions of step 406. Details are not described herein again.

In a possible example, the second network device may identify, in a manner of parsing the packet or analyzing a traffic feature, whether the service flow is the service flow indicated by the first application-aware identifier. For example, the second network device may identify, by analyzing 4-tuple information, 5-tuple information, or 7-tuple information of the service packet, whether the service flow is the service flow indicated by the first application-aware identifier. Alternatively, the second network device may further analyze the service packet of the service flow by using a DPI technology, to identify whether the service flow is the service flow indicated by the first application-aware identifier. Alternatively, the second network device may further analyze the traffic feature of the service flow by using an AI model, to identify whether the service flow is the service flow indicated by the first application-aware identifier.

In another possible example, the controller may synchronously deliver an identifier generation rule in step 503, and the second network device may generate the second application-aware identifier of the target service flow according to the identifier generation rule. If the second application-aware identifier matches the first application-aware identifier, the second network device may determine that the target service flow received by the second network device is the service flow indicated by the first application-aware identifier. For a process in which the second network device generates the second application-aware identifier according to the identifier generation rule delivered by the controller, refer to the related descriptions of step 404 and step 405. Details are not described herein again.

Step 507: The second network device forwards, to the first network device, the service packet in which the target application-aware identifier is encapsulated.

For an implementation process of step 507, refer to the related descriptions of step 407.

Step 508: If determining that the received target service flow is the service flow indicated by the first application-aware identifier, the first network device forwards the service packet of the target service flow by using the first network service and based on the correspondence.

If detecting that the target application-aware identifier is encapsulated in the service packet of the target service flow, the first network device may forward the service packet of the target service flow by using the first network service corresponding to the target application-aware identifier and based on the correspondence delivered by the controller. For an implementation process of step 508, refer to the related descriptions of step 408.

It may be understood that, after step 501, the controller may further send, to the second network device, the user requirement that is of the target service flow and that is obtained by the controller. Correspondingly, the second network device may generate the first application-aware identifier of the target service flow based on the user requirement sent by the controller. In other words, step 503 may be deleted, and the second network device may perform step 502. For example, both the controller and the second network device may perform step 502.

In conclusion, this embodiment provides a packet forwarding method. A controller or a second network device can generate a first application-aware identifier of a target service flow based on a user requirement of the target service flow. The first application-aware identifier corresponds to a first network service, and is used by the network device to encapsulate a target application-aware identifier in a service packet of the target service flow. Therefore, it can be ensured that the network device that receives the service packet can forward the service packet by using the corresponding first network service, so that flexibility of forwarding the service packet is effectively improved. In addition, according to the method provided in this embodiment, the controller or the second network device may alternatively generate an application-aware identifier of the service flow. Therefore, manners of generating the application-aware identifier are effectively enriched.

Figure 11:
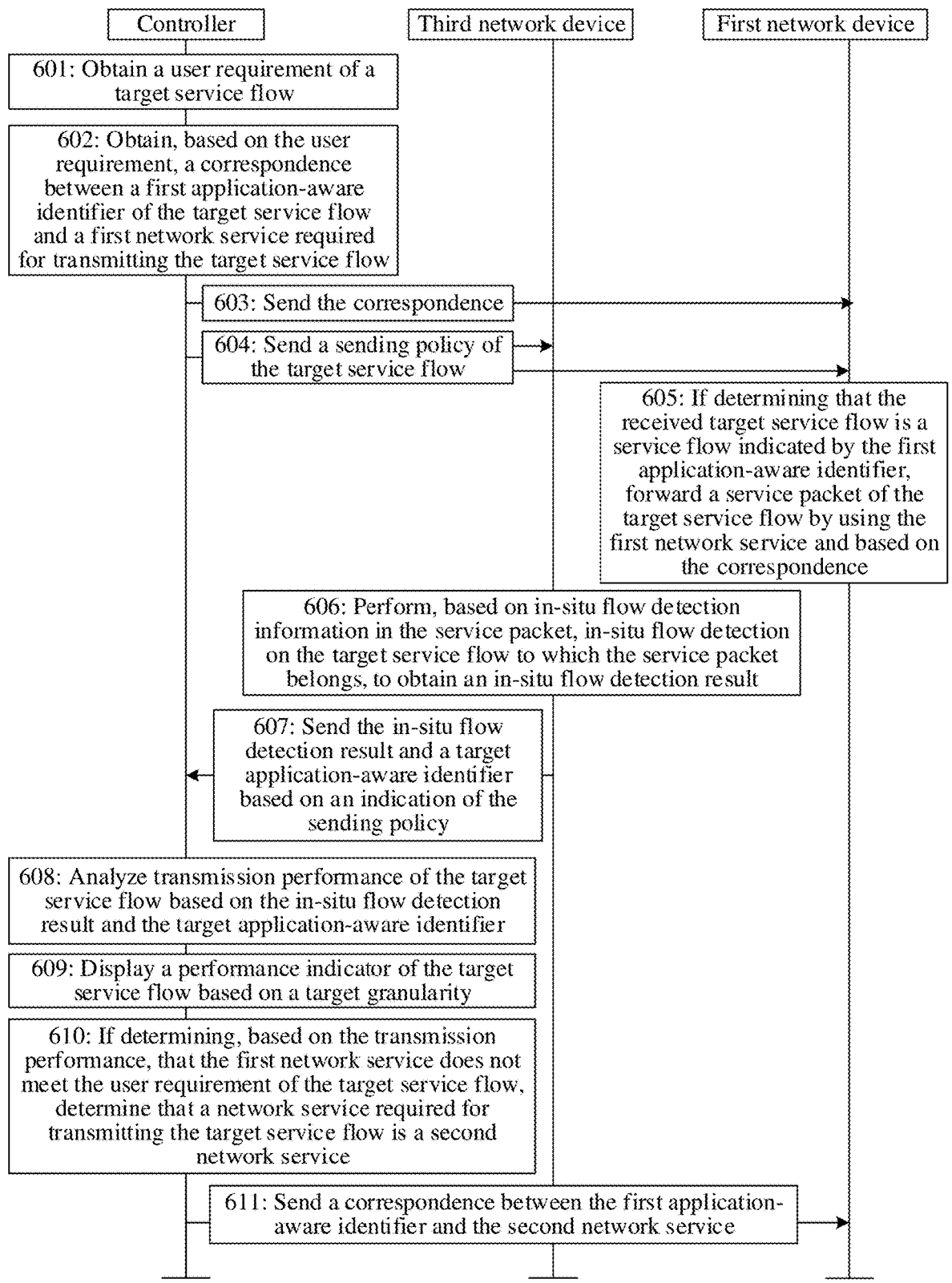
FIG. 11 is a flowchart of another method for detecting performance of a service flow according to an embodiment.

FIG. 11 is a flowchart of another method for detecting performance of a service flow according to an embodiment. As shown in FIG. 11, the method includes the following steps.

Step 601: A controller obtains a user requirement of a target service flow.

Step 602: The controller obtains, based on the user requirement, a correspondence between a first application-aware identifier of the target service flow and a first network service required for transmitting the target service flow.

Step 603: The controller separately sends the correspondence to the first network device and a third network device.

For an implementation process of step 601 to step 603, refer to the related descriptions of step 401 to step 403, or refer to the related descriptions of step 501, step 502, step 504, and step 505.

Step 604: The controller sends a sending policy of the target service flow to the first network device and/or the third network device.

The sending policy indicates to report an in-situ flow detection result of the target service flow. In this embodiment, the controller may detect and analyze transmission performance of only some key service flows (including the target service flow), to reduce data processing pressure of the controller. Correspondingly, the controller may send a sending policy of the key service flow to the network device, to indicate the network device to report an in-situ flow detection result of the key service flow, and in-situ flow detection results of other non-key service flows do not need to be reported.

In this embodiment, the third network device may be a node on a forwarding path (for example, a forwarding path in the first network service) of the target service flow, and the third network device may be an ingress node, a transit node, or an egress node on an in-situ flow detection path of the target service flow. In addition, the third network device and the first network device may be a same network device, or may be different network devices.

Optionally, the sending policy may include a value of one or more fields in the application-aware identifier of the target service flow. For example, the sending policy may include one or more of the following information: an application identifier of an application to which the target service flow belongs, a user identifier of a user to which the target service flow belongs, a flow identifier of the target service flow, and an SLA level of the target service flow.

For example, refer to FIG. 1. If the first network device is 02b, and the third network device includes network devices 02c and 02d, the controller 01 may separately deliver the sending policy of the target service flow to the network devices 02b, 02c, and 02d.

Step 605: If determining that the received target service flow is a service flow indicated by the first application-aware identifier, the first network device forwards a service packet of the target service flow by using the first network service and based on the correspondence.

For an implementation process of step 605, refer to the related descriptions of step 408.

Step 606: The third network device performs, based on in-situ flow detection information in the service packet, in-situ flow detection on the target service flow to which the service packet belongs, to obtain the in-situ flow detection result.

In this embodiment, the third network device may receive the service packet that is of the target service flow and that is forwarded by the first network device. If the service packet includes the in-situ flow detection information (for example, IFIT information), the third network device may perform, based on the in-situ flow detection information, in-situ flow detection on the target service flow to which the service packet belongs, to obtain the in-situ flow detection result. The in-situ flow detection result may include a measurement result of a performance indicator such as a latency and/or a packet loss rate of the target service flow.

It may be understood that the in-situ flow detection information may be encapsulated in the service packet by the ingress node on the in-situ flow detection path of the target service flow. The ingress node may be a second network device, or may be the first network device, or may be a downstream network device of a first network device, for example, may be the third network device. If the ingress node is the third network device, the third network device may encapsulate the in-situ flow detection information in the service packet of the target service flow, and may perform in-situ flow detection on the target service flow based on the in-situ flow detection information, to obtain the in-situ flow detection result.

Step 607: The third network device sends the in-situ flow detection result and a target application-aware identifier to the controller based on the indication of the sending policy.

In this embodiment, the third network device may obtain the target application-aware identifier of the target service flow. If determining, based on the target application-aware identifier and the sending policy, that the target service flow is a key service flow whose in-situ flow detection result needs to be reported, the third network device may send the in-situ flow detection result and the target application-aware identifier of the target service flow to the controller.

Optionally, the sending policy of the target service flow may include a value of one or more fields in the application-aware identifier of the target service flow. After obtaining the target application-aware identifier of the target service flow, the third network device may detect whether a value of each field in the sending policy matches a value of a corresponding field in the target application-aware identifier. If a value of each field in the sending policy matches a value of a corresponding field in the target application-aware identifier, the third network device may determine that the target service flow is the key service flow whose in-situ flow detection result needs to be reported, and report the in-situ flow detection result and the target application-aware identifier of the target service flow to the controller.

It may be understood that, after obtaining an application-aware identifier of a service flow, if detecting that a value of any field in the sending policy does not match a value of a corresponding field in the application-aware identifier, the third network device may determine that the service flow is not a key service flow, and does not need to report an in-situ flow detection result and an application-aware identifier of the service flow.

For example, refer to FIG. 1. It is assumed that the sending policy includes: a user identifier=UID 1. If a target application-aware identifier that is of a target service flow and that is obtained by the third network devices 02c and 02d includes a user identifier, and the user identifier is the UID 1, both the third network devices 02c and 02d may determine that the target service flow is a key service flow, and may report an in-situ flow detection result and the target application-aware identifier of the target service flow. If a user identifier in an application-aware identifier that is of a service flow and that is obtained by the third network device is a UID 2, the third network device may determine that the service flow is not a key service flow, and does not need to report an in-situ flow detection result and the application-aware identifier of the service flow.

The third network device may report, according to the sending policy delivered by the controller, only the in-situ flow detection result of the key service flow, and does not need to report the in-situ flow detection result of the non-key service flow. Therefore, a data amount of the in-situ flow detection result that needs to be received and processed by the controller is reduced, that is, data processing pressure of the controller is reduced, and a reporting granularity of the in-situ flow detection result is flexibly adjusted. In addition, because the data amount of the in-situ flow detection result that needs to be reported by the third network device is reduced, a transmission resource occupied by the in-situ flow detection result can be further effectively reduced.

In a possible implementation, the third network device may obtain the target application-aware identifier of the target service flow from the service packet of the target service flow. The target application-aware identifier may be the first application-aware identifier delivered by the controller, or may be a second application-aware identifier generated by the network device.

In this implementation, the target application-aware identifier may be encapsulated in the service packet by an application-aware edge device (such as the foregoing second network device); or may be encapsulated in the service packet by the ingress node on the in-situ flow detection path of the target service flow; or may be encapsulated in the service packet by a headend network device (such as the foregoing first network device) configured to forward the first network service of the target service flow; or may be encapsulated in the service packet by an application to which the target service flow belongs.

Figure 12:
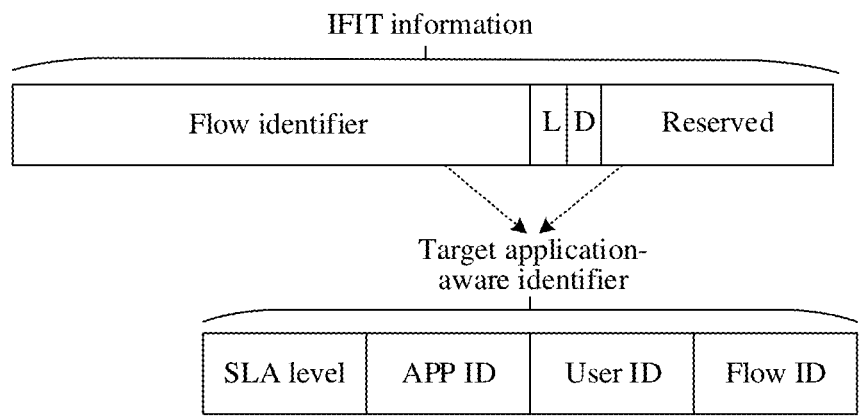
FIG. 12 is a schematic diagram of a structure of IFIT information according to an embodiment.

Optionally, if the in-situ flow detection information in the service packet is IFIT information, as shown in FIG. 12, the target application-aware identifier may be encapsulated in a flow identifier field of the IFIT information. That is, the target application-aware identifier may be replaced with a monitoring flow identifier (FlowMonID) in the IFIT information. Alternatively, the target application-aware identifier may be encapsulated in a reserved field of the IFIT information. That is, the IFIT information may include the FlowMonID, and also include the target application-aware identifier.

In another possible implementation, the target application-aware identifier of the target service flow is not encapsulated in the service packet that is of the target service flow and that is received by the third network device. In this implementation, the controller may further deliver an identifier generation rule to the third network device. After receiving the service packet of the target service flow, the third network device may generate the second application-aware identifier of the target service flow according to the identifier generation rule delivered by the controller. Correspondingly, the foregoing target application-aware identifier may be the second application-aware identifier generated by the third network device. For a process in which the third network device generates the second application-aware identifier, refer to step 405.

Alternatively, the controller may further deliver the correspondence between the first application-aware identifier and the first network service to the third network device. After receiving the service packet of the target service flow, the third network device may determine, in a manner of parsing the packet or analyzing a traffic feature, that the target service flow is the service flow indicated by the first application-aware identifier. In other words, the third network device may determine, in the manner of parsing the packet or analyzing the traffic feature, that the application-aware identifier of the target service flow is the first application-aware identifier. Correspondingly, the foregoing target application-aware identifier may alternatively be the first application-aware identifier delivered by the controller.

It may be understood that, if the target application-aware identifier is not encapsulated in the service packet that is of the target service flow and that is received by the third network device, after the third network device obtains the target application-aware identifier of the target service flow, the third network device may encapsulate the target application-aware identifier in the service packet of the target service flow, and forward the service packet in which the target application-aware identifier is encapsulated.

For example, assuming that the service packet that is of the target service flow and that is received by the third network device includes the IFIT information, the third network device may encapsulate the target application-aware identifier in the flow identifier field or the reserved field of the IFIT information. Certainly, the third network device may alternatively encapsulate the target application-aware identifier in a destination address field, an HBH, a DOH, or an SRH of the service packet.

It may be further understood that, if the target application-aware identifier in the service packet received by the third network device is encapsulated in the destination address field, the HBH, the DOH, or the SRH, the third network device may alternatively extract the target application-aware identifier from an original encapsulation location, and re-encapsulate the target application-aware identifier in the flow identifier field or the reserved field of the IFIT information. Then, the third network device may forward the re-encapsulated service packet.

Step 608: The controller analyzes transmission performance of the target service flow based on the in-situ flow detection result and the target application-aware identifier.

In this embodiment, after receiving the in-situ flow detection result and the target application-aware identifier that are sent by the third network device, the controller can analyze the transmission performance of the target service flow by using a granularity indicated by at least one identifier in the target application-aware identifier. The transmission performance may be represented by using a performance indicator such as a packet loss rate and/or a latency.

In an in-situ flow detection scenario, the controller may receive an in-situ flow detection result reported by at least one third network device on the in-situ flow detection path of the target service flow, and the controller may analyze the transmission performance of the target service flow based on the received at least one in-situ flow detection result. The at least one third network device may include an ingress node, an intermediate node, and/or an egress node on the in-situ flow detection path.

For example, if the at least one third network device includes the ingress node and the egress node, the controller may implement end-to-end detection on the transmission performance of the target service flow. If the at least one third network device includes the ingress node, the intermediate node, and the egress node, the controller may implement hop-by-hop detection on the transmission performance of the target service flow.

It may be understood that the controller may receive in-situ flow detection results and application-aware identifiers that are of different service flows and that are reported by different network devices, and the controller may determine an in-situ flow detection result of a same service flow based on the application-aware identifier, and may further analyze transmission performance of the service flow based on one or more in-situ flow detection results of the same service flow.

It may be further understood that the target service flow indicated by the target application-aware identifier may be a specified data flow, or may be a group of data flows. In other words, the target service flow may include a plurality of data flows. For example, the group of data flows may include data flows of different applications used by a same user, or data flows of different users under a same application. If the target service flow is a group of data flows, the controller may analyze transmission performance of data flows in this group of service flows based on a received in-situ flow detection result, or may analyze overall transmission performance of this group of service flows, which may also be referred to as average transmission performance.

Optionally, in step 607, when sending the in-situ flow detection result and the target application-aware identifier to the controller, the third network device may further report a corresponding in-situ flow detection flow identifier. The in-situ flow detection flow identifier may be obtained from the in-situ flow detection information. For example, the in-situ flow detection flow identifier may be a monitoring flow identifier (FlowMonID) in the IFIT information. The in-situ flow detection flow identifier may indicate a monitored data flow in the target service flow, which may be understood as that the in-situ flow detection result is a detection result for the data flow indicated by the in-situ flow detection flow identifier.

Correspondingly, the controller may determine, based on a correspondence between the target application-aware identifier and the in-situ flow detection flow identifier, at least one data flow included in the target service flow; and may further analyze, based on the in-situ flow detection result, transmission performance of the at least one data flow included in the target service flow.

In a scenario in which the target service flow includes a plurality of monitored data flows, because each monitored data flow has a unique in-situ flow detection flow identifier (for example, FlowMonID), the controller may further generate a correspondence between the target application-aware identifier and a plurality of in-situ flow detection flow identifiers. When analyzing the transmission performance of the target service flow, the controller may analyze transmission performance of each monitored data flow included in the target service flow. Then, the controller may further determine the overall transmission performance (for example, the average transmission performance) of the target service flow based on the transmission performance of each monitored data flow. For example, the controller may calculate a packet loss rate of each monitored data flow in the target service flow, and use an average value of the packet loss rates of the monitored data flows as an average packet loss rate of the target service flow.

Step 609: The controller displays the performance indicator of the target service flow based on a target granularity.

The performance indicator indicates the transmission performance of the target service flow. For example, the performance indicator may include at least one of a packet loss rate and a latency. The target granularity is a granularity indicated by the at least one identifier in the target application-aware identifier. Because the target application-aware identifier may include at least one of a user identifier and an application identifier, the controller can display the performance indicator of the service flow by using a user and/or an application as a granularity. If the target application-aware identifier further includes a flow identifier (such as a session ID) and an SLA level, the controller can further display the performance indicator of the service flow by using the flow identifier and/or the SLA level as a granularity.

It may be understood that the target granularity may be flexibly configured and adjusted based on a requirement of an application scenario, for example, may be configured and adjusted by operations and maintenance personnel.

If the target granularity is a user granularity, the controller can display a performance indicator of at least one service flow of each user in one or more users by using a user as a unit. For each user, the controller may display a performance indicator of each service flow (for example, a service flow of each application used by the user) of the user, or may display an average value of the performance indicators of a plurality of service flows of the user.

If the target granularity is an application granularity, the controller can display a performance indicator of at least one service flow of each of one or more applications by using an application as a unit. For each application, the controller may display a performance indicator of each service flow (for example, a service flow of each user who uses the application) of the application, or may display an average value of performance indicators of a plurality of service flows of the application. The average value may be an arithmetic average value, a root mean square average value, or a weighted average value.

If the target granularity is a user+application granularity, the controller can display, by using a user and an application as a unit, a performance indicator of at least one service flow that has a same user identifier and a same application identifier.

For example, it is assumed that the controller obtains in-situ flow detection results of a total of three service flows: a service flow 1 to a service flow 3, and application-aware identifiers of the three service flows are shown in Table 2. If the target granularity is the user granularity, and a user identifier of a target user whose performance indicator needs to be displayed is a UID 1, the controller may separately display performance indicators of the service flow 1 and the service flow 2, or the controller may calculate and display an average value of performance indicators of the service flow 1 and the service flow 2.

If the target granularity is the application granularity, and an application identifier of a target application whose performance indicator needs to be displayed is an AID 1, the controller may separately display performance indicators of the service flow 1 and the service flow 3, or the controller may calculate and display an average value of performance indicators of the service flow 1 and the service flow 3.

If the target granularity is the user+application granularity, a user identifier of the service flow whose performance indicator needs to be displayed is a UID 1, and an application identifier is an AID 2, the controller may display the performance indicator of the service flow 2.

TABLE 2

| Service flow | Application-aware identifier | |
|---|---|---|
| | User identifier | Application identifier |
| Service flow 1 | UID 1 | AID 1 |
| Service flow 2 | UID 1 | AID 2 |
| Service flow 3 | UID 2 | AID 1 |

It can be understood based on the foregoing analysis that the application-aware identifier of the service flow may include information in a plurality of different dimensions of the service flow. Therefore, the performance indicator of the service flow is displayed by using the granularity indicated by the identifier in the application-aware identifier, so that refined visualization of the performance indicator can be implemented. In addition, a display granularity of the performance indicator may be further flexibly adjusted based on a requirement, so that flexibility of displaying the performance indicator is effectively improved.

Step 610: If determining, based on the transmission performance, that the first network service does not meet the user requirement of the target service flow, the controller determines that a network service required for transmitting the target service flow is a second network service.

In this embodiment, because the target application-aware identifier that is of the target service flow and that is reported by the third network device matches the first application-aware identifier generated by the controller, the controller may determine that the target service flow is the service flow indicated by the first application-aware identifier. Further, the controller may determine the user requirement of the target service flow, and may detect, based on the transmission performance that is of the target service flow and that is obtained through analysis, whether the transmission performance meets the user requirement of the target service flow. If determining that the transmission performance of the target service flow does not meet the user requirement of the target service flow, the controller may further recalculate the second network service that can meet the user requirement of the target service flow, that is, the controller may update the network service of the target service flow from the first network service to the second network service.

It may be understood that if the controller determines that the transmission performance of the target service flow can meet the user requirement of the target service flow, the network service used to transmit the target service flow does not need to be updated.

Step 611: The controller sends a correspondence between the first application-aware identifier and the second network service to the first network device.

The controller may re-deliver the correspondence between the first application-aware identifier and the second network service to the first network device, for example, may deliver a correspondence between the first application-aware identifier and an identifier of the second network service. After receiving the correspondence, the first network device may forward the service packet of the target service flow by using the second network service.

In a process of transmitting the target service flow, the controller may analyze the transmission performance of the target service flow based on the in-situ flow detection result, and adjust, in time based on the transmission performance, the network service allocated to the target service flow. Therefore, closed-loop dynamic optimization of a network resource is implemented, and the transmission performance of the target service flow is effectively ensured.

For example, it is assumed that the first application-aware identifier of the target service flow is an APN ID 1, an identifier of the first network service is a BSID 1, and the second network service recalculated by the controller is an SRv6 path indicated by a BSID 2. Refer to FIG. 1. The controller 01 may deliver a correspondence between the APN ID 1 and the BSID 2 to the network device 02*b*. The network device 02*b* may subsequently forward the service packet of the target service flow through the SRv6 path indicated by the BSID 2.

It may be understood that, in a scenario in which the first network device and the application-aware edge device (such as the foregoing second network device) are different devices, the controller may further send the correspondence between the first application-aware identifier and the second network service to the second network device. For example, refer to FIG. 1. The controller 01 may further send the correspondence between the first application-aware identifier and the second network service to the network device 02*a*.

Optionally, in step 607, the third network device may alternatively not need to detect, according to the sending policy, whether the target service flow is the key service flow, but may directly report the in-situ flow detection result and the target application-aware identifier of the target service flow to the controller. In other words, if detecting that the service packet includes in-situ flow detection information, the third network device may perform, based on the in-situ flow detection information, in-situ flow detection on the service flow to which the service packet belongs, and directly report the in-situ flow detection result and the application-aware identifier of the service flow to the controller.

In a possible example, step 604 may be deleted based on a situation. For example, the controller does not need to deliver the sending policy of the target service flow. Correspondingly, the third network device does not need to detect, according to the sending policy, whether the target service flow is the key service flow.

In another possible example, the third network device may have an application-aware identifier processing function. If the application-aware identifier processing function is enabled, the third network device may detect, based on the target application-aware identifier and the sending policy, whether the target service flow is the key service flow. If the application-aware identifier processing function is disabled, the third network device does not need to detect, according to the sending policy, whether the target service flow is the key service flow.

Optionally, the third network device may enable or disable the application-aware identifier processing function of the third network device based on a received configuration instruction. The configuration instruction may be delivered by the controller, or may be directly configured by the operations and maintenance personnel.

It may be further understood that, after receiving the service packet of the target service flow, the third network device may further first detect, according to the sending policy, whether the target service flow is the key service flow. If determining that the target service flow is the key service flow, the third network device may perform step 606 to obtain the in-situ flow detection result of the target service flow. If determining that the target service flow is not the key service flow, the third network device does not need to perform step 606, for example, the third network device does not need to perform in-situ flow detection on the non-key service flow.

It may be further understood that, in a possible implementation, in step 601, the controller may send the sending policy of the target service flow to each node on the in-situ flow detection path of the target service flow. In this case, each node on the in-situ flow detection path may detect, based on the method shown in step 607, whether the received service flow is the key service flow.

In another possible implementation, the controller may send the sending policy of the target service flow to only the application-aware edge device (such as the second network device). The second network device may determine, based on the target application-aware identifier of the target service flow and the sending policy, that the target service flow is the key service flow whose in-situ flow detection result needs to be reported, and may add mark information to the service packet of the target service flow. A downstream network device (for example, the third network device) of the second network device may further determine, based on the mark information, that the target service flow is the key service flow. Correspondingly, in this implementation, the third network device may directly determine, based on the mark information in the service packet, whether the service flow to which the service packet belongs is the key service flow.

It may be further understood that an execution sequence of the steps in the foregoing packet forwarding method may be adjusted based on a situation, or the steps may be added or deleted based on a situation. For example, step 604 may be performed before step 603; or step 609 may be deleted based on a situation; or step 610 and step 611 may be performed before step 609; or step 610 and step 611 may be deleted based on a situation.

In conclusion, this embodiment provides a packet forwarding method. When reporting an in-situ flow detection result of a target service flow to the controller, the network device may also report a target application-aware identifier of the target service flow. Further, the controller can detect and analyze transmission performance of the service flow by using a granularity indicated by at least one identifier in the target application-aware identifier, so that flexibility of detecting and analyzing the transmission performance of the service flow is effectively improved. In addition, the controller may further display a performance indicator of the service flow based on the granularity indicated by the at least one identifier in the target application-aware identifier. Therefore, refined and flexible visualization of the performance indicator is implemented.

Figure 13:
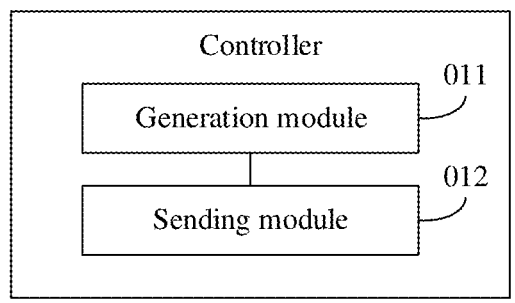
FIG. 13 is a schematic diagram of a structure of a controller according to an embodiment.

FIG. 13 is a schematic diagram of a structure of a controller according to an embodiment. The controller may be used in the communication network shown in FIG. 1 or FIG. 7, and may implement steps performed by the controller in the embodiment shown in FIG. 2, FIG. 6, FIG. 10, or FIG. 11. Refer to FIG. 13. The controller includes:

a generation module 011, configured to obtain, based on a user requirement of a target service flow, a correspondence between a first application-aware identifier of the target service flow and a first network service required for transmitting the target service flow. For implementation of a function of the generation module 011, refer to the related descriptions of step 101, step 402, or step 602 in the foregoing method embodiment.

A sending module 012 is configured to send the correspondence to a first network device, where the correspondence is used by the first network device to determine, based on the first application-aware identifier, the first network service used to forward a service packet of the target service flow. For implementation of a function of the sending module 012, refer to the related descriptions of step 102, step 403, step 505, or step 603 in the foregoing method embodiment.

Optionally, the correspondence includes an identifier of the first network service, and the identifier of the first network service includes: a binding segment identifier and/or an identifier of a network slice.

Optionally, the first application-aware identifier includes at least one of a user identifier and an application identifier.

Optionally, the first application-aware identifier further includes at least one of a flow identifier, an SLA level, or a service requirement.

Optionally, the sending module 012 is further configured to send an identifier generation rule to the first network device, so that the first network device generates a second application-aware identifier of the target service flow according to the identifier generation rule, and the second application-aware identifier is used to match the first application-aware identifier to determine the first network service. For implementation of a function of the sending module 012, further refer to the related descriptions of step 404 in the foregoing method embodiment.

Optionally, the sending module 012 is further configured to send the first application-aware identifier of the target service flow to a second network device, where the first application-aware identifier is used by the second network device to encapsulate the application-aware identifier of the target service flow in the service packet of the target service flow if the second network device determines that the received service flow is the target service flow. For implementation of a function of the sending module 012, further refer to the related descriptions of step 503 in the foregoing method embodiment.

Figure 14:
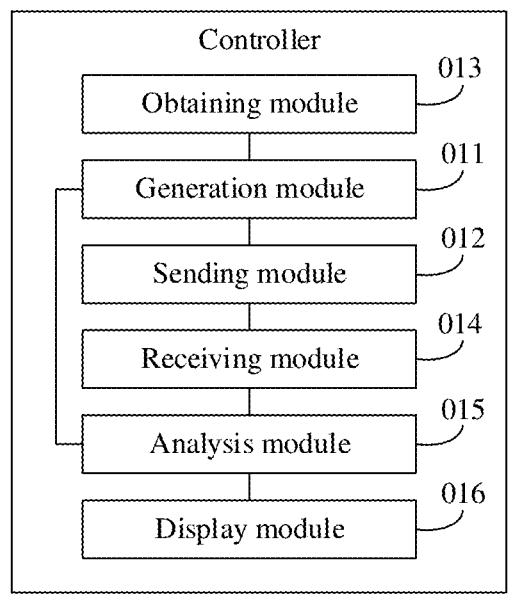
FIG. 14 is a schematic diagram of a structure of another controller according to an embodiment.

Optionally, as shown in FIG. 14, the controller may further include: an obtaining module 013, configured to obtain the user requirement of the target service flow through a northbound interface. For implementation of a function of the obtaining module 013, refer to the related descriptions of step 401, step 501, or step 601 in the foregoing method embodiment.

Optionally, still refer to FIG. 14. The controller may further include:

a receiving module 014, configured to receive an in-situ flow detection result and a target application-aware identifier that are sent by a third network device, where the target application-aware identifier is an application-aware identifier of a service flow to which the in-situ flow detection result belongs, and the target application-aware identifier is the first application-aware identifier, or the second application-aware identifier that is of the target service flow and that is generated by the network device. For implementation of a function of the receiving module 014, refer to the related descriptions of step 607 in the foregoing method embodiment.

An analysis module 015 is configured to analyze transmission performance of the target service flow based on the in-situ flow detection result and the target application-aware identifier. For implementation of a function of the analysis module 015, refer to the related descriptions of step 608 in the foregoing method embodiment.

Optionally, as shown in FIG. 14, the controller may further include:

a display module 016, configured to display a performance indicator of the target service flow based on a target granularity, where the performance indicator indicates the transmission performance of the target service flow; and the target granularity is a granularity indicated by at least one identifier in the target application-aware identifier.

For implementation of a function of the display module 016, refer to the related descriptions of step 609 in the foregoing method embodiment.

Optionally, the generation module 011 is further configured to: determine, based on the transmission performance of the target service flow, that the first network service does not meet the user requirement of the target service flow; and determine that a network service required for transmitting the target service flow is a second network service. For implementation of a function of the generation module 011, refer to the related descriptions of step 610 in the foregoing method embodiment.

The sending module 012 is further configured to send a correspondence between the first application-aware identifier and the second network service to the first network device. For implementation of a function of the sending module 012, further refer to the related descriptions of step 611 in the foregoing method embodiment.

Optionally, the sending module 012 is further configured to send a sending policy of the target service flow to the first network device and/or the third network device before the receiving module 014 receives the in-situ flow detection result and the target application-aware identifier that are sent by the third network device, where the sending policy indicates to report the in-situ flow detection result of the target service flow. For implementation of a function of the sending module 012, further refer to the related descriptions of step 604 in the foregoing method embodiment.

Optionally, the receiving module 014 may be configured to receive the in-situ flow detection result, the target application-aware identifier, and a corresponding in-situ flow detection flow identifier that are sent by the third network device. The in-situ flow detection flow identifier is also referred to as a monitoring flow identifier, and may indicate a monitored data flow in the target service flow.

The analysis module 015 may be configured to: determine, based on a correspondence between the target application-aware identifier and the in-situ flow detection flow identifier, at least one data flow included in the target service flow; and analyze, based on the in-situ flow detection result, transmission performance of the at least one data flow included in the target service flow.

Optionally, the user requirement of the target service flow includes one or more of the following requirements: a requirement for a specified forwarding path, a requirement for a specified network slice, and a requirement for a performance indicator of transmission performance.

In conclusion, this embodiment provides a controller, where the controller may obtain a correspondence between an application-aware identifier of a service flow and a network service required for transmitting the service flow, and deliver the correspondence to a network device. Further, when identifying the service flow as a service flow indicated by the application-aware identifier, the network device may directly forward a packet of the service flow by using the corresponding network service. The controller may establish and deliver the correspondence between the application-aware identifier of the service flow and the network service, so that the network device can directly forward the service packet of the service flow based on the correspondence. Therefore, flexibility of forwarding the service packet is effectively improved.

Figure 15:
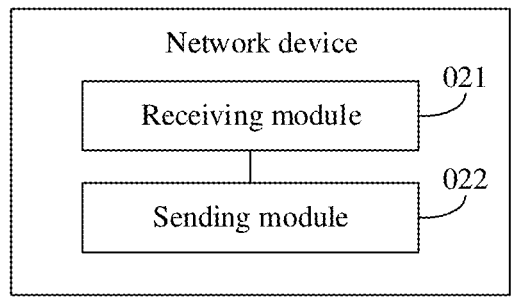
FIG. 15 is a schematic diagram of a structure of a network device according to an embodiment.

FIG. 15 is a schematic diagram of a structure of a network device according to an embodiment. The network device may be used in the communication network shown in FIG. 1 or FIG. 7. For example, the network device may be the network device 02a, 02c, or 02d in FIG. 1 or FIG. 7, or may be the network device 02b shown in FIG. 1. In addition, the network device may implement steps performed by at least one of the first network device, the second network device, and the third network device in the embodiment shown in FIG. 2, FIG. 6, FIG. 10, or FIG. 11. Refer to FIG. 15. The network device includes:

a receiving module 021, configured to receive a correspondence that is between a first application-aware identifier and a first network service and that is sent by a controller in the network, where the first application-aware identifier is generated by the controller based on a user requirement of a service flow. For implementation of a function of the receiving module 021, refer to the related descriptions of step 102, step 403, step 505, or step 603 in the foregoing method embodiment.

A sending module 022 is configured to: if the received target service flow is a service flow indicated by the first application-aware identifier, forward a service packet of the target service flow by using the first network service and based on the correspondence. For implementation of a function of the sending module 022, refer to the related descriptions of step 103, step 408, step 508, or step 605 in the foregoing method embodiment.

Figure 16:
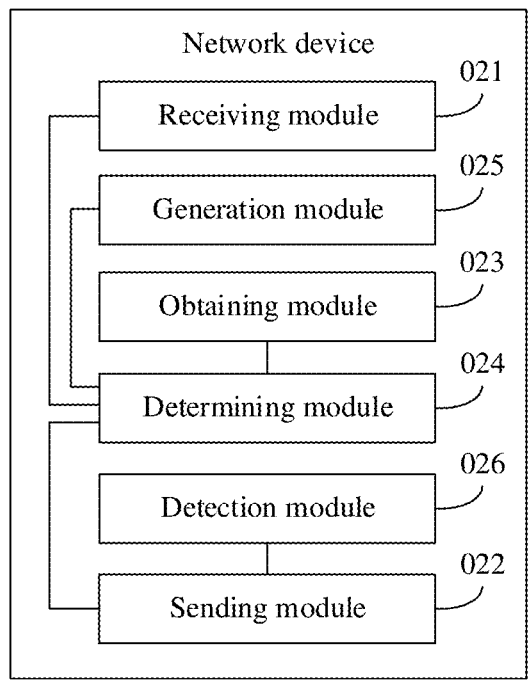
FIG. 16 is a schematic diagram of a structure of another network device according to an embodiment.

Optionally, as shown in FIG. 16, the network device may further include:

an obtaining module 023, configured to obtain a second application-aware identifier of the target service flow from the service packet of the target service flow; and a determining module 024, configured to: if the second application-aware identifier matches the first application-aware identifier, determine that the target service flow is the service flow indicated by the first application-aware identifier.

Optionally, the service packet received by the network device includes IFIT information, and the second application-aware identifier is encapsulated in a flow identifier field or a reserved field of the IFIT information. Alternatively, the second application-aware identifier is encapsulated in a destination address field, an HBH, a DOH, or an SRH of the service packet.

Optionally, the second application-aware identifier is encapsulated in a BSID field of the SRH field.

Optionally, the receiving module 021 may be further configured to receive an identifier generation rule sent by the controller. For implementation of a function of the receiving module 021, further refer to the related descriptions of step 404 in the foregoing method embodiment.

Still refer to FIG. 16. The network device may further include:

a generation module 025, configured to generate a second application-aware identifier of the target service flow according to the identifier generation rule. For implementation of a function of the generation module 025, refer to the related descriptions of step 405 in the foregoing method embodiment.

The determining module 024 is configured to: if the second application-aware identifier matches the first application-aware identifier, determine that the target service flow is the service flow indicated by the first application-aware identifier. For implementation of a function of the determining module 024, refer to the related descriptions of step 406 in the foregoing method embodiment.

Optionally, the service packet received by the network device includes IFIT information. The sending module 022 may be configured to: encapsulate the target application-aware identifier in a flow identifier field or a reserved field of the IFIT information, and forward, by using the first network service, the service packet in which the target application-aware identifier is encapsulated. For implementation of a function of the sending module 022, further refer to the related descriptions of step 406 or step 506 in the foregoing method embodiment.

Optionally, as shown in FIG. 16, the network device may further include:

a detection module 026, configured to: if the service packet that is of the target service flow and that is received by the receiving module 021 includes in-situ flow detection information, perform in-situ flow detection on the target service flow based on the in-situ flow detection information, to obtain an in-situ flow detection result. For implementation of a function of the detection module 026, refer to the related descriptions of step 606 in the foregoing method embodiment.

The sending module 022 is further configured to send the in-situ flow detection result and the target application-aware identifier to the controller, where the target application-aware identifier is the first application-aware identifier, or the second application-aware identifier that is of the target service flow and that is obtained by the network device. For implementation of a function of the sending module 022, further refer to the related descriptions of step 607 in the foregoing method embodiment.

Optionally, the receiving module 021 may be further configured to receive a sending policy that is of the target service flow and that is sent by the controller, where the sending policy indicates to report the in-situ flow detection result of the target service flow. For implementation of a function of the receiving module 021, further refer to the related descriptions of step 604 in the foregoing method embodiment.

The sending module 022 may be configured to send the in-situ flow detection result and the target application-aware identifier to the controller based on the indication of the sending policy.

Optionally, the sending module 022 may be configured to send the in-situ flow detection result, the target application-aware identifier, and a corresponding in-situ flow detection flow identifier to the controller. The in-situ flow detection flow identifier may indicate a monitored data flow in the target service flow.

In conclusion, this embodiment provides a network device. The network device may receive a correspondence that is between an application-aware identifier of a service flow and a network service required for transmitting the service flow and that is delivered by a controller, and when identifying the service flow as a service flow indicated by the application-aware identifier, may directly forward a packet of the service flow by using the corresponding network service. The controller may establish and deliver the correspondence between the application-aware identifier of the service flow and the network service, so that the network device can directly forward the service packet of the service flow based on the correspondence. Therefore, flexibility of forwarding the service packet is effectively improved.

Figure 17:
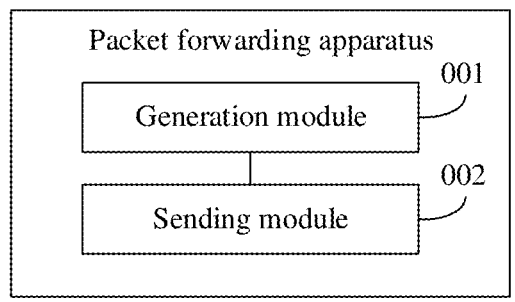
FIG. 17 is a schematic diagram of a structure of a packet forwarding apparatus according to an embodiment.

FIG. 17 is a schematic diagram of a structure of a packet forwarding apparatus according to an embodiment. The packet forwarding apparatus may be used in the communication network shown in FIG. 1 or FIG. 7, and may implement the steps in the embodiment shown in FIG. 4. Refer to FIG. 17. The packet forwarding apparatus includes:

a generation module 001, configured to generate a first application-aware identifier of a target service flow based on a user requirement of the target service flow, where the first application-aware identifier is used by a network device to encapsulate a target application-aware identifier in a service packet of the target service flow, the target application-aware identifier is the first application-aware identifier or a second application-aware identifier matching the first application-aware identifier, the first application-aware identifier corresponds to a first network service, and the first network service meets the user requirement of the target service flow. For implementation of a function of the generation module 001, refer to the related descriptions of step 201 in the foregoing method embodiment.

A sending module 002 is configured to send the first application-aware identifier, where the first application-aware identifier is used by the network device to forward the service packet of the target service flow by using the first network service. For implementation of a function of the sending module 002, refer to the related descriptions of step 202 in the foregoing method embodiment.

In a possible implementation, the packet forwarding apparatus may be used in a controller in the communication network shown in FIG. 1 or FIG. 7, and may further implement steps performed by the controller in the embodiment shown in FIG. 6, FIG. 10, or FIG. 11.

The generation module 001 may be configured to generate the first application-aware identifier of the target service flow based on the obtained user requirement of the target service flow. For implementation of a function of the generation module 001, further refer to the related descriptions of step 402, step 502, or step 602 in the foregoing method embodiment.

The sending module 002 is configured to send the first application-aware identifier to a second network device, so that the second network device encapsulates the target application-aware identifier in the service packet of the target service flow. For implementation of a function of the sending module 002, further refer to the related descriptions of step 503 in the foregoing method embodiment.

Figure 18:
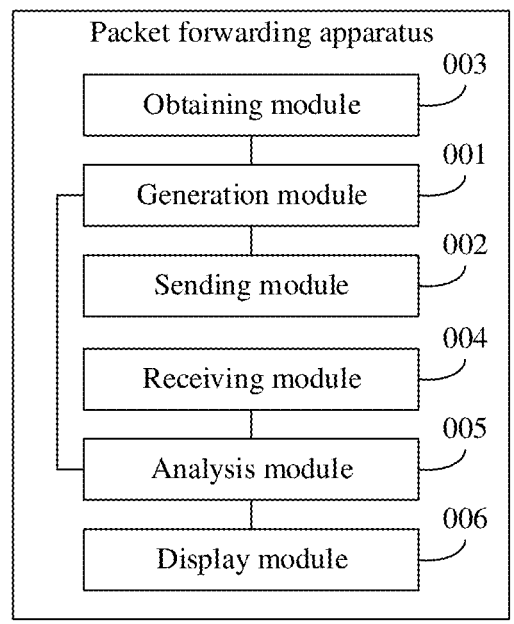
FIG. 18 is a schematic diagram of a structure of another packet forwarding apparatus according to an embodiment.

Optionally, as shown in FIG. 18, the apparatus may further include:

an obtaining module 003, configured to obtain the user requirement of the target service flow through a northbound interface. For implementation of a function of the obtaining module 003, refer to the related descriptions of step 401, step 501, or step 601 in the foregoing method embodiment.

Optionally, the generation module 001 is further configured to determine, based on the user requirement of the target service flow, the first network service required for transmitting the target service flow. For implementation of a function of the generation module 001, further refer to the related descriptions of step 503 in the foregoing method embodiment.

The sending module 002 is further configured to send a correspondence between the first application-aware identifier and the first network service to a first network device, where the correspondence is used by the first network device to determine, based on the first application-aware identifier, the first network service used to forward the service packet of the target service flow. For implementation of a function of the sending module 002, further refer to the related descriptions of step 403, step 505, or step 603 in the foregoing method embodiment.

Optionally, still refer to FIG. 18. The apparatus may further include:

a receiving module 004, configured to receive an in-situ flow detection result and the target application-aware identifier that are sent by a third network device. For implementation of a function of the receiving module 004, refer to the related descriptions of step 607 in the foregoing method embodiment.

An analysis module 005 is configured to analyze transmission performance of the target service flow based on the in-situ flow detection result and the target application-aware identifier. For implementation of a function of the analysis module 005, refer to the related descriptions of step 608 in the foregoing method embodiment.

Optionally, as shown in FIG. 18, the apparatus may further include:

a display module 006, configured to display a performance indicator of the target service flow based on a target granularity, where the performance indicator indicates the transmission performance of the target service flow; and the target granularity is a granularity indicated by at least one identifier in the target application-aware identifier. For implementation of a function of the display module 006, refer to the related descriptions of step 609 in the foregoing method embodiment.

Optionally, the receiving module 004 may be configured to receive the in-situ flow detection result, the target application-aware identifier, and a corresponding in-situ flow detection flow identifier that are sent by the third network device.

The analysis module 005 may be configured to: determine, based on a correspondence between the target application-aware identifier and the in-situ flow detection flow identifier, at least one data flow included in the target service flow; and analyze, based on the in-situ flow detection result, transmission performance of the at least one data flow included in the target service flow.

Optionally, the generation module 001 may be further configured to: determine, based on the transmission performance of the target service flow, that the first network service does not meet the user requirement of the target service flow; and determine that a network service required for transmitting the target service flow is a second network service. For implementation of a function of the generation module 001, further refer to the related descriptions of step 610 in the foregoing method embodiment.

The sending module 002 may be further configured to send a correspondence between the first application-aware identifier and the second network service to the first network device. For implementation of a function of the sending module 002, further refer to the related descriptions of step 611 in the foregoing method embodiment.

Optionally, the sending module 002 may be further configured to send a sending policy of the target service flow to the second network device and/or the third network device before the receiving module 004 receives the in-situ flow detection result and the target application-aware identifier that are sent by the third network device, where the sending policy indicates to report the in-situ flow detection result of the target service flow. For implementation of a function of the sending module 002, further refer to the related descriptions of step 604 in the foregoing method embodiment.

In another possible implementation, the packet forwarding apparatus may be used in a network device in the communication network shown in FIG. 1 or FIG. 7, and may further implement steps performed by at least one of the first network device, the second network device, and the third network device in the embodiment shown in FIG. 6, FIG. 10, or FIG. 11.

The generation module 001 may be configured to generate a first application-aware identifier of a target service flow based on a user requirement that is of the target service flow and that is sent by a controller. For implementation of a function of the generation module 001, further refer to the related descriptions of step 502.

The sending module 002 may be configured to: encapsulate the first application-aware identifier in a service packet of the target service flow, and forward the service packet in which the first application-aware identifier is encapsulated. For implementation of a function of the sending module 002, further refer to the related descriptions of step 506 and step 507 in the foregoing method embodiment.

Figure 19:
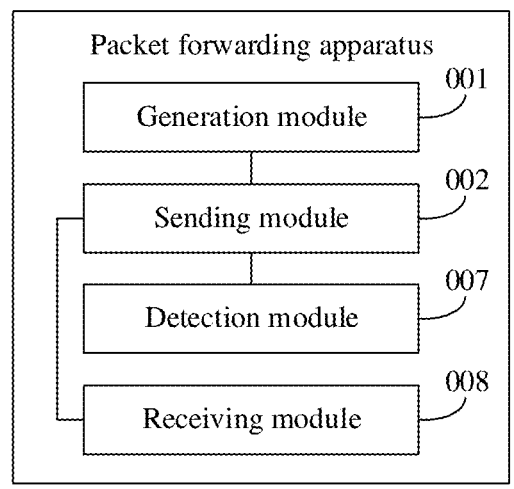
FIG. 19 is a schematic diagram of a structure of still another packet forwarding apparatus according to an embodiment.

Optionally, if the service packet that is of the target service flow and that is received by the second network device includes in-situ flow detection information, as shown in FIG. 19, the apparatus may further include:
  a detection module 007, configured to perform in-situ flow detection on the target service flow based on the in-situ flow detection information, to obtain an in-situ flow detection result. For implementation of a function of the detection module 007, refer to the related descriptions of step 606 in the foregoing method embodiment.

The sending module 002 may be further configured to send the in-situ flow detection result and the first application-aware identifier to the controller. For implementation of a function of the sending module 002, further refer to the related descriptions of step 607 in the foregoing method embodiment.

Optionally, still refer to FIG. 19. The apparatus may further include:
  a receiving module 008, configured to receive a sending policy that is of the target service flow and that is sent by the controller, where the sending policy indicates to report the in-situ flow detection result of the target service flow. For implementation of a function of the receiving module 008, further refer to the related descriptions of step 604 in the foregoing method embodiment.

The sending module 002 may be configured to send the in-situ flow detection result and the first application-aware identifier to the controller based on the indication of the sending policy.

Optionally, the sending module 002 may be configured to send the in-situ flow detection result, the first application-aware identifier, and a corresponding in-situ flow detection flow identifier to the controller.

Optionally, the sending module 002 may be configured to: encapsulate the first application-aware identifier in a flow identifier field or a reserved field of IFIT information of the service packet; or encapsulate the first application-aware identifier in a destination address field, an HBH, a DOH, or an SRH of the service packet.

Optionally, the user requirement of the target service flow includes one or more of the following requirements: a requirement for a specified forwarding path, a requirement for a specified network slice, and a requirement for a performance indicator of transmission performance.

Optionally, the target application-aware identifier includes at least one of a user identifier and an application identifier.

In conclusion, this embodiment provides a packet forwarding apparatus. The packet forwarding apparatus can generate a first application-aware identifier based on a user requirement of a target service flow. The first application-aware identifier corresponds to a first network service, and is encapsulated in a service packet of the target service flow. Therefore, it can be ensured that a network device that receives the service packet can forward the service packet by using the corresponding first network service, so that flexibility of forwarding the service packet is effectively improved.

Figure 20:
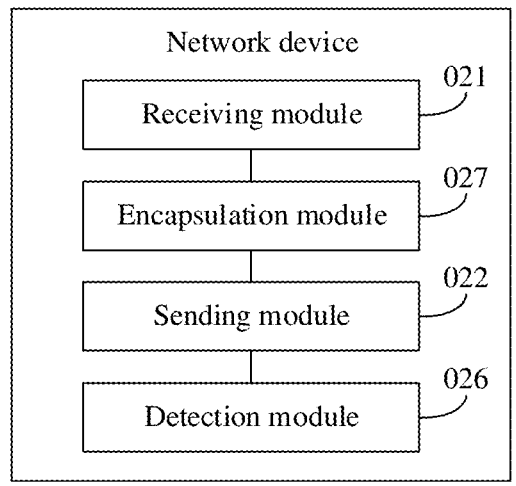
FIG. 20 is a schematic diagram of a structure of still another network device according to an embodiment.

FIG. 20 is a schematic diagram of a structure of a network device according to an embodiment. The network device may be used in the communication network shown in FIG. 1 or FIG. 7. For example, the network device may be the network device 02a, 02c, or 02d in FIG. 1 or FIG. 7, or may be the network device 02b shown in FIG. 1. In addition, the network device may implement steps in the embodiment shown in FIG. 4, or implement steps performed by at least one of the first network device, the second network device, and the third network device in the embodiment shown in FIG. 6, FIG. 10, or FIG. 11. Refer to FIG. 20. The network device includes:
  a receiving module 021, configured to receive a first application-aware identifier sent by a controller, where the first application-aware identifier is generated based on a user requirement of a service flow, the first application-aware identifier corresponds to a first network service, and the first network service meets the user requirement of the service flow. For implementation of a function of the receiving module 021, refer to the related descriptions of step 503 in the foregoing method embodiment.

An encapsulation module 027 is configured to: if the received target service flow is a service flow indicated by the first application-aware identifier, encapsulate a target application-aware identifier in a service packet of the target service flow, where the target application-aware identifier is the first application-aware identifier or a second application-aware identifier matching the first application-aware identifier. For implementation of a function of the encapsulation module 027, refer to the related descriptions of step 506 in the foregoing method embodiment.

A sending module 022 is configured to forward the service packet in which the target application-aware identifier is encapsulated. For implementation of a function of the sending module 022, refer to the related descriptions of step 507 in the foregoing method embodiment.

Optionally, if the service packet that is of the target service flow and that is received by the network device includes in-situ flow detection information, as shown in FIG. 20, the network device may further include:

a detection module 026, configured to perform in-situ flow detection on the target service flow based on the in-situ flow detection information, to obtain an in-situ flow detection result. For implementation of a function of the detection module 026, refer to the related descriptions of step 606 in the foregoing method embodiment.

The sending module 022 is further configured to send the in-situ flow detection result and the target application-aware identifier to the controller. For implementation of a function of the sending module 022, refer to the related descriptions of step 607 in the foregoing method embodiment.

Optionally, the sending module 022 may be configured to send the in-situ flow detection result, the target application-aware identifier, and a corresponding in-situ flow detection flow identifier to the controller.

Optionally, the encapsulation module 027 may be configured to: encapsulate the target application-aware identifier in a flow identifier field or a reserved field of IFIT information of the service packet; or encapsulate the target application-aware identifier in a destination address field, an HBH, a DOH, or an SRH of the service packet.

Optionally, the receiving module 021 may be configured to receive a correspondence that is between the first application-aware identifier and the first network service and that is sent by the controller. For implementation of a function of the receiving module 021, further refer to the related descriptions of step 403, step 505, or step 603 in the foregoing method embodiment.

Correspondingly, the sending module 022 may be configured to forward, by using the first network service, the service packet in which the target application-aware identifier is encapsulated. For implementation of a function of the sending module 022, refer to the related descriptions of step 408, step 508, or step 605 in the foregoing method embodiment.

In conclusion, this embodiment provides a network device. The network device may receive a first application-aware identifier that is of a target service flow and that is delivered by a controller, and encapsulate the first application-aware identifier in a service packet of the target service flow. The first application-aware identifier corresponds to a first network service. Therefore, it can be ensured that the network device that receives the service packet can forward the service packet by using the corresponding first network service, so that flexibility of forwarding the service packet is effectively improved.

Figure 21:
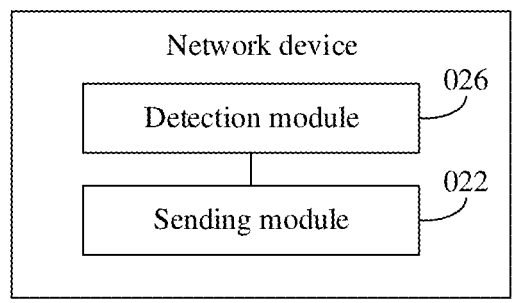
FIG. 21 is a schematic diagram of a structure of yet another network device according to an embodiment.

FIG. 21 is a schematic diagram of a structure of a network device according to an embodiment. The network device may be used in the communication network shown in FIG. 1 or FIG. 7. For example, the network device may be the network device 02a, 02c, or 02d in FIG. 1 or FIG. 7, or may be the network device 02b shown in FIG. 1. In addition, the network device may implement steps performed by at least one of the first network device, the second network device, and the third network device in the embodiment shown in FIG. 5, FIG. 6, FIG. 10, or FIG. 11. Refer to FIG. 21. The network device includes:

a detection module 026, configured to perform, based on in-situ flow detection information in a service packet, in-situ flow detection on a target service flow to which the service packet belongs, to obtain an in-situ flow detection result. For implementation of a function of the detection module 026, refer to the related descriptions of step 301 and step 606 in the foregoing method embodiment.

A sending module 022 is configured to send the in-situ flow detection result and a target application-aware identifier of the target service flow to a controller in the network, where the target application-aware identifier is generated based on a user requirement of the target service flow, and the in-situ flow detection result and the target application-aware identifier are used by the controller to analyze transmission performance of the target service flow. For implementation of a function of the sending module 022, refer to the related descriptions of step 303 and step 607 in the foregoing method embodiment.

Optionally, the target application-aware identifier is encapsulated in the service packet, and the target application-aware identifier indicates a user and/or an application to which the target service flow belongs.

Optionally, if the in-situ flow detection information is IFIT information, the target application-aware identifier is encapsulated in a flow identifier field or a reserved field of the IFIT information.

Figure 22:
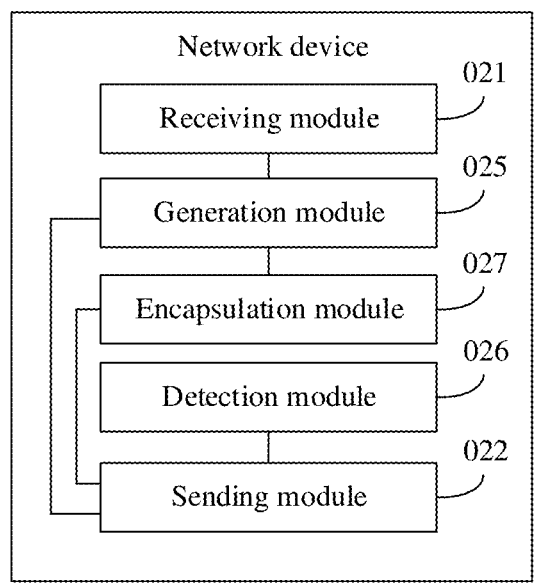
FIG. 22 is a schematic diagram of a structure of yet another network device according to an embodiment.

Optionally, as shown in FIG. 22, the network device may further include:

a receiving module 021, configured to receive a correspondence that is between a first application-aware identifier and a first network service and that is sent by a controller, where the first application-aware identifier is generated by the controller based on a user requirement of a service flow. For implementation of a function of the receiving module 021, refer to the related descriptions of step 403, step 505, or step 603 in the foregoing method embodiment.

The sending module 022 is further configured to: if the target service flow is a service flow indicated by the first application-aware identifier, forward a service packet of the target service flow by using the first network service and based on the correspondence. For implementation of a function of the sending module 022, refer to the related descriptions of step 408, step 508, or step 605 in the foregoing method embodiment.

Optionally, the receiving module 021 may be further configured to receive an identifier generation rule sent by the controller. For implementation of a function of the receiving module 021, further refer to the related descriptions of step 404 in the foregoing method embodiment.

A generation module 025 is configured to generate a second application-aware identifier of the target service flow according to the identifier generation rule. The target application-aware identifier is the second application-aware identifier or the first application-aware identifier that is of the target service flow and that is sent by the controller. For implementation of a function of the generation module 025, refer to the related descriptions of step 405 in the foregoing method embodiment.

Optionally, the in-situ flow detection information is IFIT information. As shown in FIG. 22, the network device may further include:

an encapsulation module 027, configured to encapsulate the target application-aware identifier in a flow identifier field or a reserved field of the IFIT information. For implementation of a function of the encapsulation module 027, refer to the related descriptions of step 506 in the foregoing method embodiment.

The sending module 022 may be further configured to forward the service packet in which the target application-aware identifier is encapsulated. For implementation of a function of the sending module 022, further refer to the related descriptions of step 507 in the foregoing method embodiment.

Optionally, the receiving module 021 may be further configured to receive a sending policy that is of the target service flow and that is sent by the controller, where the sending policy indicates to report the in-situ flow detection result of the target service flow. For implementation of a function of the receiving module 021, further refer to the related descriptions of step 604 in the foregoing method embodiment.

The sending module 022 is configured to send the in-situ flow detection result and the target application-aware identifier of the target service flow to the controller based on the indication of the sending policy.

Optionally, the sending module 022 may be configured to send the in-situ flow detection result, the target application-aware identifier of the target service flow, and a corresponding in-situ flow detection flow identifier to the controller in the network.

Optionally, the target application-aware identifier includes at least one of a user identifier and an application identifier.

In conclusion, this embodiment provides a network device. When reporting an in-situ flow detection result of a target service flow to a controller, the network device may also report a target application-aware identifier of the target service flow. Further, the controller can detect and analyze transmission performance of the service flow by using a granularity indicated by at least one identifier in the target application-aware identifier, so that flexibility of detecting and analyzing the transmission performance of the service flow is effectively improved.

Figure 23:
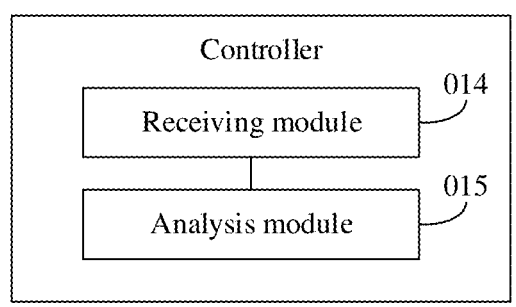
FIG. 23 is a schematic diagram of a structure of still another controller according to an embodiment.

FIG. 23 is a schematic diagram of a structure of still another controller according to an embodiment. The controller may be used in the communication network shown in FIG. 1 or FIG. 7, and may implement steps performed by the controller in the embodiment shown in FIG. 5, FIG. 6, FIG. 10, or FIG. 11. Refer to FIG. 23. The controller includes:

a receiving module 014, configured to receive an in-situ flow detection result and a target application-aware identifier that are sent by a third network device, where the in-situ flow detection result is obtained by the third network device by performing in-situ flow detection on a target service flow, and the target application-aware identifier is generated based on a user requirement of the target service flow. For implementation of a function of the receiving module 014, refer to the related descriptions of step 607 in the foregoing method embodiment.

An analysis module 015 is configured to analyze transmission performance of the target service flow based on the in-situ flow detection result and the target application-aware identifier. For implementation of a function of the analysis module 015, refer to the related descriptions of step 608 in the foregoing method embodiment.

Optionally, the target application-aware identifier includes at least one of a user identifier and an application identifier. As shown in FIG. 14, the controller may further include:

a display module 016, configured to display a performance indicator of the target service flow based on a target granularity, where the performance indicator indicates the transmission performance of the target service flow; and the target granularity is a granularity indicated by the at least one identifier in the target application-aware identifier. For implementation of a function of the display module 016, refer to the related descriptions of step 609 in the foregoing method embodiment.

Optionally, still refer to FIG. 14. The controller may further include:

a sending module 012, configured to send a sending policy of the target service flow to the third network device before the receiving module 014 receives the in-situ flow detection result and the target application-aware identifier that are sent by the third network device, where the sending policy indicates to report the in-situ flow detection result of the target service flow. For implementation of a function of the sending module 012, further refer to the related descriptions of step 604 in the foregoing method embodiment.

Optionally, the receiving module 011 may be configured to receive the in-situ flow detection result, the target application-aware identifier, and a corresponding in-situ flow detection flow identifier that are sent by the third network device. Correspondingly, the analysis module 012 may be configured to: determine, based on a correspondence between the target application-aware identifier and the in-situ flow detection flow identifier, at least one data flow included in the target service flow; and analyze, based on the in-situ flow detection result, transmission performance of the at least one data flow included in the target service flow.

Optionally, as shown in FIG. 14, the controller may further include:

a generation module 011, configured to obtain, based on a user requirement of a target service flow, a correspondence between a first application-aware identifier of the target service flow and a first network service required for transmitting the target service flow. For implementation of a function of the generation module 011, refer to the related descriptions of step 402 or step 602 in the foregoing method embodiment.

The sending module 012 is further configured to send the correspondence to a first network device, where the correspondence is used by the first network device to determine, based on the first application-aware identifier, the first network service used to forward a service packet of the target service flow. The target application-aware identifier is the first application-aware identifier or a second application-aware identifier that is of the target service flow and that is generated by the network device. For implementation of a function of the sending module 012, refer to the related descriptions of step 403, step 505, or step 603 in the foregoing method embodiment.

Optionally, the generation module 011 is further configured to: if determining, based on the transmission performance of the target service flow, that the first network service does not meet the user requirement of the target service flow, determine that a network service required for transmitting the target service flow is a second network service. For implementation of a function of the generation module 011, refer to the related descriptions of step 610 in the foregoing method embodiment.

The sending module 012 is further configured to send a correspondence between the first application-aware identifier and the second network service to the first network device. For implementation of a function of the sending module 012, further refer to the related descriptions of step 611 in the foregoing method embodiment.

Optionally, the sending module 012 is further configured to send the first application-aware identifier of the target service flow to a second network device. For implementation of a function of the sending module 012, further refer to the related descriptions of step 503 in the foregoing method embodiment.

Optionally, refer to FIG. 14. The controller may further include:

an obtaining module 013, configured to obtain the user requirement of the target service flow through a northbound interface. For implementation of a function of the obtaining module 013, refer to the related descriptions of step 401, step 501, or step 601 in the foregoing method embodiment.

In conclusion, this embodiment provides a controller. When receiving an in-situ flow detection result that is of a target service flow and that is reported by a network device, the controller may receive a target application-aware identifier that is of the target service flow and that is also reported by the network device. Therefore, the controller can detect and analyze transmission performance of the service flow by using a granularity indicated by at least one identifier in the target application-aware identifier, so that flexibility of detecting and analyzing the transmission performance of the service flow is effectively improved.

It may be clearly understood by a person skilled in the art that, for the purpose of convenient and brief description, for a detailed working process of the foregoing controller, network device, packet forwarding apparatus, and each module, refer to a corresponding process in the foregoing method embodiment. Details are not described herein.

It should be understood that the controller, the network device, and the packet forwarding apparatus provided in embodiments may all be implemented by using an application-specific integrated circuit (ASIC) or a programmable logic device (PLD). The PLD may be a complex program logic device (CPLD), a field-programmable gate array (FPGA), generic array logic (GAL), or any combination thereof. Alternatively, the packet forwarding method provided in the foregoing method embodiment may be implemented by software. When the packet forwarding method provided in the foregoing method embodiment is implemented by software, modules in the foregoing controller and network device may also be software modules.

Figure 24:
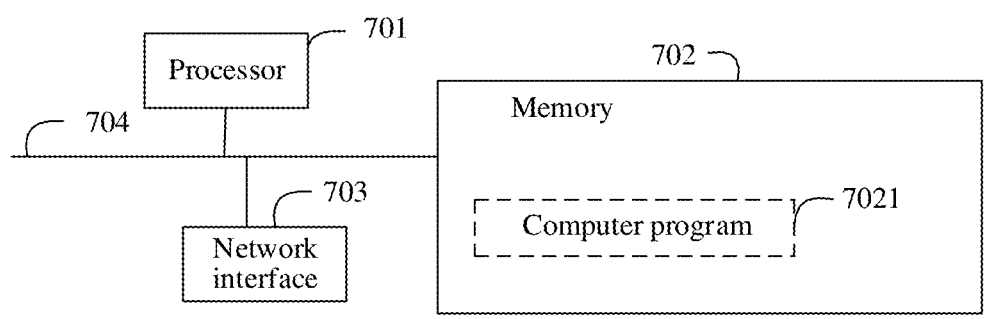
FIG. 24 is a schematic diagram of a structure of yet another packet forwarding apparatus according to an embodiment.

FIG. 24 is a schematic diagram of a structure of yet another packet forwarding apparatus according to an embodiment. The packet forwarding apparatus may be used in a controller or a network device in the communication network shown in FIG. 1 or FIG. 7. For example, the packet forwarding apparatus may be used in the network device 02a, 02c, or 02d in FIG. 1 or FIG. 7, or may be used in the network device 02b shown in FIG. 1. As shown in FIG. 24, the packet forwarding apparatus may include: a processor 701, a memory 702, a network interface 703, and a bus 704. The bus 704 is configured to connect the processor 701, the memory 702, and the network interface 703. A communication connection to another device may be implemented through the network interface 703 (which may be wired or wireless). The memory 702 stores a computer program 7021, and the computer program 7021 is used to implement a plurality of application functions. When the modules shown in FIG. 13 to FIG. 23 are implemented by using software modules, programs corresponding to the software modules may be stored in the memory 702 of the network device.

It should be understood that in this embodiment, the processor 701 may be a CPU, or the processor 701 may be another general-purpose processor, a digital signal processor (DSP), an application-specific integrated circuit (ASIC), a field-programmable gate array (FPGA), a GPU, or another programmable logic device, a discrete gate or transistor logic device, a discrete hardware assembly, or the like. The general-purpose processor may be a microprocessor, any conventional processor, or the like.

The memory 702 may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example, and not limitation, RAMs in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The bus 704 may further include a power bus, a control bus, a status signal bus, and the like, in addition to a data bus. However, for clear description, various types of buses in the figure are denoted as the bus 704.

According to a first aspect, the processor 701 may be configured to: obtain, based on a user requirement of a target service flow, a correspondence between a first application-aware identifier of the target service flow and a first network service required for transmitting the target service flow, and send the correspondence to a first network device, where the correspondence is used by the first network device to determine, based on the first application-aware identifier, the first network service used to forward a service packet of the target service flow. For a detailed processing process of the processor 701, refer to the foregoing method embodiment. For example, reference may be made to detailed descriptions of step 101 and step 102 in the embodiment shown in FIG. 2, or detailed descriptions of step 401 to step 404 in the embodiment shown in FIG. 6, or detailed descriptions of step 501 to step 505 in the embodiment shown in FIG. 10, or detailed descriptions of step 601 to step 604 and step 608 to step 611 in the embodiment shown in FIG. 11. Details are not described herein again.

According to a second aspect, the processor 701 may be configured to: receive a correspondence that is between a first application-aware identifier and a first network service and that is sent by the controller in the network, and if a received target service flow is a service flow indicated by the first application-aware identifier, forward a service packet of the target service flow by using the first network service and based on the correspondence, where the first application-aware identifier is generated by the controller based on a user requirement of the service flow. For a detailed processing process of the processor 701, refer to the foregoing method embodiment. For example, reference may be made to detailed descriptions of step 103 in the embodiment shown in FIG. 2, or detailed descriptions of step 405 to step 408 in the embodiment shown in FIG. 6, or detailed descriptions of step 506 to step 508 in the embodiment shown in FIG. 10, or detailed descriptions of step 606 and step 607 in the embodiment shown in FIG. 11. Details are not described herein again.

According to a third aspect, the processor 701 may be configured to: generate a first application-aware identifier of a target service flow based on a user requirement of the target service flow, and send the first application-aware identifier. The first application-aware identifier is used by a network device to encapsulate a target application-aware identifier of the target service flow in a service packet of the target service flow, and the target application-aware identifier is the first application-aware identifier, or a second application-aware identifier that is of the target service flow and that is generated by the network device. The first application-aware identifier corresponds to a first network service, the first application-aware identifier is used by the network device to forward the service packet of the target service flow by using the first network service, and the first network service meets the user requirement of the target service flow. For a detailed processing process of the processor 701, refer to the foregoing method embodiment. For example, reference may be made to detailed descriptions of step 201 and step 202 in the embodiment shown in FIG. 2, or steps performed by the controller or any network device in the embodiment shown in FIG. 6, FIG. 10, or FIG. 11. Details are not described herein again.

According to a fourth aspect, the processor 701 may be configured to: receive a first application-aware identifier sent by the controller, where the first application-aware identifier is generated based on a user requirement of a service flow, the first application-aware identifier corresponds to a first network service, and the first network service meets the user requirement of the service flow; and if the received target service flow is a service flow indicated by the first application-aware identifier, encapsulate a target application-aware identifier in a service packet of the target service flow, and forward the service packet in which the target application-aware identifier is encapsulated, where the target application-aware identifier is the first application-aware identifier or a second application-aware identifier matching the first application-aware identifier. For a detailed processing process of the processor 701, refer to the foregoing method embodiment. For example, reference may be made to detailed descriptions of step 405 to step 408 in the embodiment shown in FIG. 6, or detailed descriptions of step 506 to step 508 in the embodiment shown in FIG. 10, or reference may be further made to detailed descriptions of step 606 and step 607 in the embodiment shown in FIG. 11. Details are not described herein again.

According to a fifth aspect, the processor 701 may be configured to: perform, based on in-situ flow detection information in a service packet, in-situ flow detection on a target service flow to which the service packet belongs, to obtain an in-situ flow detection result; and send the in-situ flow detection result and a target application-aware identifier of the target service flow to the controller in the network. The target application-aware identifier is generated based on a user requirement of the target service flow, and the in-situ flow detection result and the target application-aware identifier are used by the controller to analyze transmission performance of the target service flow. For example, reference may be made to detailed descriptions of step 301 and step 302 in the embodiment shown in FIG. 5, or detailed descriptions of step 405 to step 408 in the embodiment shown in FIG. 6, or detailed descriptions of step 506 to step 508 in the embodiment shown in FIG. 10, or detailed descriptions of step 606 and step 607 in the embodiment shown in FIG. 11. Details are not described herein again.

According to a sixth aspect, the processor 701 may be configured to: receive an in-situ flow detection result and a target application-aware identifier that are sent by a third network device, where the in-situ flow detection result is obtained by the third network device by performing in-situ flow detection on a target service flow, and the target application-aware identifier is generated based on a user requirement of the target service flow; and analyze transmission performance of the target service flow based on the in-situ flow detection result and the target application-aware identifier. For a detailed processing process of the processor 701, refer to the foregoing method embodiment. For example, reference may be made to detailed descriptions of step 303 in the embodiment shown in FIG. 5, or detailed descriptions of step 401 to step 404 in the embodiment shown in FIG. 6, or detailed descriptions of step 501 to step 505 in the embodiment shown in FIG. 10, or detailed descriptions of step 601 to step 604 and step 608 to step 611 in the embodiment shown in FIG. 11. Details are not described herein again.

Figure 25:
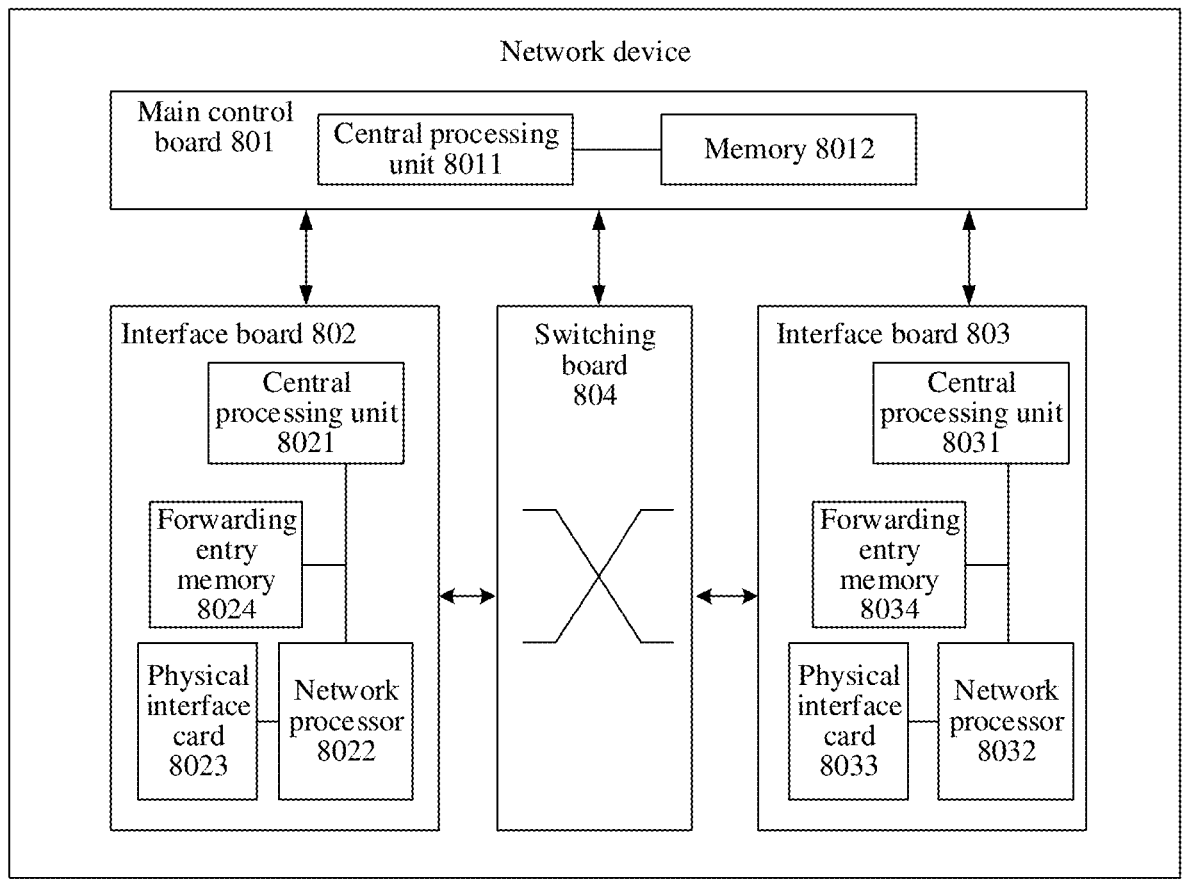
FIG. 25 is a schematic diagram of a structure of yet another network device according to an embodiment.

FIG. 25 is a schematic diagram of a structure of yet another network device according to an embodiment. The network device may be used in the communication network shown in FIG. 1 or FIG. 7. For example, the network device may be the network device 02*a*, 02*c*, or 02*d* in FIG. 1 or FIG. 7, or may be the network device 02*b* shown in FIG. 1. As shown in FIG. 25, the network device may include: a main control board 801 and at least one interface board (where the interface board is also referred to as a line card or a service board). For example, FIG. 25 shows an interface board 802 and an interface board 803. If there are a plurality of interface boards, a switching board 804 may be included, and the switching board 804 is configured to complete data exchange between the interface boards.

The main control board 801 is configured to implement functions such as system management, device maintenance, and protocol processing. The interface board 802 and the interface board 603 are configured to: provide various service interfaces (for example, a POS interface, a GE interface, and an ATM interface), and forward a packet. The main control board 801 includes three types of functional units: a system management control unit, a system clock unit, and a system maintenance unit. The main control board 801, the interface board 802, and the interface board 803 implement interworking by using a connection between a system bus and a platform backboard. The interface board 802 includes one or more central processing units 8021. The central processing unit 8021 is configured to: control and manage the interface board 802, communicate with a central processing unit 8011 on the main control board 801, and forward a packet. A forwarding entry memory 8024 on the interface board 802 is configured to store a forwarding entry. The central processing unit 8021 may forward the packet by searching the forwarding entry stored in the forwarding entry memory 8024.

One or more physical interface cards 6023 included in the interface board 802 are configured to: receive a packet sent by a previous-hop node, and send a processed packet to a next-hop node based on an instruction of the central processing unit 8021. A specific implementation process is not described herein again. Specific functions of the central processing unit 8021 are not described herein again either.

It may be understood that a receiving module 021 and a sending module 022 in the network device may be located in the interface board 802, and an obtaining module 023, a determining module 024, a generation module 025, a detection module 026, and an encapsulation module 027 may be located in the main control board 801.

It may be further understood that, as shown in FIG. 25, in this embodiment, a plurality of interface boards are included, and a distributed forwarding mechanism is used. In this mechanism, a structure of the interface board 803 is basically the same as a structure of the interface board 802, and operations on the interface board 803 are basically similar to operations on the interface board 802. For brevity, details are not described again. In addition, it may be understood that in FIG. 25, the central processing unit 8021 and/or a network processor 8022 in the interface board 802 may be dedicated hardware or a chip, for example, an application-specific integrated circuit, to implement the foregoing functions. This implementation can be referred to as a manner of using dedicated hardware or a chip for processing on a forwarding plane. In another implementation, the central processing unit 8021 and/or the network processor 8022 may alternatively use a general-purpose processor, for example, a general-purpose CPU, to implement the foregoing functions.

In addition, it should be understood that there may be one or more main control boards 801. When there are a plurality of main control boards, a primary main control board and a secondary main control board may be included. There may be one or more interface boards, and this device having a stronger data processing capability provides more interface boards. If there are the plurality of interface boards, the plurality of interface boards can communicate with each other by using one or more switching boards, and the plurality of interface boards can jointly implement load balancing and redundancy backup. In a centralized forwarding architecture, the device may not need the switching board, and the interface board provides a function of processing service data of an entire system. In a distributed forwarding architecture, the device includes the plurality of interface boards. Data exchange between the plurality of interface boards may be implemented by using the switching board, to provide a large-capacity data exchange and processing capability. Therefore, a data access and processing capability of the network device in the distributed architecture is better than that of the device in the centralized architecture. A specific architecture that is to be used depends on a specific networking deployment scenario. This is not limited herein.

In an embodiment, a memory 8012 and a memory 8024 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk or another magnetic storage device, or any other medium that can be configured to carry or store expected program code in a form of a instruction structure or a data structure and that can be accessed by a computer, but is not limited thereto. The memory 8024 in the interface board 802 may exist independently, and is connected to the central processing unit 8021 through a communication bus. Alternatively, the memory 8024 may be integrated with the central processing unit 8021. The memory 8012 in the main control board 801 may exist independently, and is connected to the central processing unit 8011 through the communication bus. Alternatively, the memory 8012 may be integrated with the central processing unit 8011.

The memory 8024 is configured to store program code, and the central processing unit 8021 controls and executes the program code. The memory 8012 is configured to store program code, and the central processing unit 8011 controls execution of the program code. The central processing unit 8021 and/or the central processing unit 8011 may implement, by executing the program code, the packet forwarding method that is applied to the network device and that is provided in the foregoing embodiment. The program code stored in the memory 8024 and/or the memory 8012 may include one or more software modules. The one or more software modules may be the functional modules provided in the embodiment shown in any one of FIG. 15 to FIG. 17 and FIG. 19 to FIG. 22.

In a specific embodiment, the physical interface card 6023 may be a type of apparatus that uses any transceiver, and is configured to communicate with another device or a communication network, for example, an Ethernet, a radio access network (radio access network, RAN), a wireless local area network (WLAN), or the like.

An embodiment further provides a non-transitory computer-readable storage medium. The non-transitory computer-readable storage medium stores instructions, and the instructions are executed by a processor to implement the method that is performed by a controller or a network device and that is provided in the foregoing method embodiment.

An embodiment further provides a computer program product including instructions. When the computer program product runs on a computer, the computer is enabled to perform the method that is performed by a controller or a network device and that is provided in the foregoing method embodiment.

An embodiment further provides a communication network. As shown in FIG. 1 and FIG. 7, the communication network includes: a controller 01 and at least one network device. For example, FIG. 1 shows a total of five network devices: a network device 02a to a network device 02e, and FIG. 7 shows a total of four network devices: a network device 02a and network devices 02c to 02e.

The controller 01 may implement steps performed by the controller in the foregoing method embodiments, and the network device may implement steps performed by any network device in the foregoing method embodiments.

Optionally, the controller 01 may be the controller shown in FIG. 13, FIG. 14, FIG. 23, or FIG. 24, or may include the packet forwarding apparatus shown in FIG. 17 or FIG. 18. The at least one network device may include the network device shown in any one of FIG. 15, FIG. 16, FIG. 20 to FIG. 22, and FIG. 24, or may include the packet forwarding apparatus shown in FIG. 17 or FIG. 19.

Optionally, the communication network may be an APN.

An embodiment further provides a chip. The chip may be configured to implement the method performed by the controller or the network device provided in the foregoing method embodiments.

All or some of the foregoing embodiments may be implemented by software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on a computer, all or some of the processes or the functions according to embodiments are generated. The computer may be a general-purpose computer, a dedicated computer, a computer network, or other programmable apparatuses. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer-readable storage medium may be any usable medium that can be accessed by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

The term "at least one" means one or more, and the term "a plurality of" means two or more than two. For example, a plurality of nodes means two or more than two nodes. The terms "system" and "network" are often used interchangeably in the embodiments. The term "and/or" represents that three relationships may exist. For example, A and/or B may represent the following three cases: only A exists, both A and B exist, and only B exists. The character "/" can indicate an "or" relationship between the associated objects.

The foregoing descriptions are merely optional implementations, but the scope of the embodiments is not limited thereto. Any equivalent modification or replacement readily figured out by a person skilled in the art within the scope of the embodiments shall fall within their scope.

What is claimed is:

1. A network device, comprising:
one or more memories configured to store instructions; and
one or more processors coupled to the one or more memories, the one or more processors configured to execute the instructions to cause the network device to:
perform, based on in-situ flow detection information in a service packet, in-situ flow detection on a target service flow to which the service packet belongs, to obtain an in-situ flow detection result; and
send the in-situ flow detection result and a target application-aware identifier of the target service flow to a controller in a network, wherein the target application-aware identifier is generated based on a user requirement of the target service flow, the target application-aware identifier includes a user identifier and an application identifier, and further includes at least one of a flow identifier, a service level agreement (SLA) level, or a service requirement, and the in-situ flow detection result and the target application-aware identifier are used by the controller to analyze transmission performance of the target service flow, wherein the one or more processors are further configured to execute the instructions to cause the controller to:
display a performance indicator of the target service flow based on a target granularity, wherein the performance indicator indicates the transmission performance of the target service flow, and the target granularity is at least one of a user granularity and an application granularity indicated by the at least one identifier in the target application-aware identifier.

2. The network device according to claim 1, wherein the target application-aware identifier is encapsulated in the service packet, and the target application-aware identifier indicates a user and/or an application to which the target service flow belongs.

3. The network device according to claim 2, wherein the in-situ flow detection information is in-situ flow information telemetry (IFIT) information, and the target application-aware identifier is encapsulated in a flow identifier field or a reserved field of the IFIT information.

4. The network device according to claim 1, wherein the one or more processors are further configured to execute the instructions to cause the network device to:
receive a correspondence between a first application-aware identifier and a first network service that is sent by a controller, wherein the first application-aware identifier is generated by the controller based on a user requirement of a service flow; and
when the target service flow is a service flow indicated by the first application-aware identifier, forward a service packet of the target service flow by using the first network service based on the correspondence.

5. The network device according to claim 1, wherein the one or more processors are further configured to execute the instructions to cause the network device to:
receive an identifier generation rule sent by the controller; and
generate a second application-aware identifier of the target service flow according to the identifier generation rule;
wherein the target application-aware identifier is the second application-aware identifier or the first application-aware identifier of the target service flow that is sent by the controller.

6. The network device according to claim 5, wherein the in-situ flow detection information is in-situ flow information telemetry (IFIT) information, and the one or more processors are further configured to execute the instructions to cause the network device to:
encapsulate the target application-aware identifier in a flow identifier field or a reserved field of the IFIT information, and
forward the service packet in which the target application-aware identifier is encapsulated.

7. The network device according to claim 1, wherein the one or more processors are further configured to execute the instructions to cause the network device to:
receive a sending policy of the target service flow that is sent by the controller, wherein the sending policy indicates to report the in-situ flow detection result of the target service flow; and
send the in-situ flow detection result and the target application-aware identifier of the target service flow to the controller based on the indication of the sending policy.

8. The network device according to claim 1, wherein the one or more processors are further configured to execute the instructions to cause the network device to:
send the in-situ flow detection result, the target application-aware identifier of the target service flow, and a corresponding in-situ flow detection flow identifier to the controller in the network.

9. The network device according to claim 1, wherein the target application-aware identifier includes at least one of a user identifier and an application identifier.

10. A controller, comprising:
one or more memories configured to store instructions; and one or more processors coupled to the one or more memories and configured to execute the instructions to cause the controller to:

receive an in-situ flow detection result and a target application-aware identifier that are sent by a third network device, wherein the in-situ flow detection result is obtained by the third network device by performing in-situ flow detection on a target service flow, the target application-aware identifier is generated based on a user requirement of the target service flow, the target application-aware identifier includes a user identifier and an application identifier, and further includes at least one of a flow identifier, a service level agreement (SLA) level, or a service requirement; and analyze transmission performance of the target service flow based on the in-situ flow detection result and the target application-aware identifier, and display a performance indicator of the target service flow based on a target granularity, wherein the performance indicator indicates the transmission performance of the target service flow, and the target granularity is at least one of a user granularity and an application granularity indicated by the at least one identifier in the target application-aware identifier.

11. The controller according to claim 10, wherein the one or more processors are further configured to execute the instructions to cause the controller to:

send a sending policy of the target service flow to the third network device, where the sending policy indicates to report the in-situ flow detection result of the target service flow.

12. A network system, comprising:
a network device, and
a controller;
wherein the network device is configured to:
perform, based on in-situ flow detection information in a service packet, in-situ flow detection on a target service flow to which the service packet belongs, to obtain an in-situ flow detection result;
send the in-situ flow detection result and a target application-aware identifier of the target service flow to the controller, wherein the target application-aware identifier is generated based on a user requirement of the target service flow, the target application-aware identifier includes a user identifier and an application identifier, and further includes at least one of a flow identifier, a service level agreement (SLA) level, or a service requirement, and the in-situ flow detection result and the target application-aware identifier are used by the controller to analyze transmission performance of the target service flow, and
display a performance indicator of the target service flow based on a target granularity, wherein the performance indicator indicates the transmission performance of the target service flow, and the target granularity is at least one of a user granularity and an application granularity indicated by the at least one identifier in the target application-aware identifier.

13. The network system according to claim 12, wherein the target application-aware identifier is encapsulated in the service packet, and the target application-aware identifier indicates a user and/or an application to which the target service flow belongs.

14. The network system according to claim 13, the in-situ flow detection information is in-situ flow information telemetry (IFIT) information, the target application-aware identifier is encapsulated in a flow identifier field or a reserved field of the IFIT information.

15. The network system according to claim 12, wherein the network device is further configured to:
receive a correspondence between a first application-aware identifier and a first network service that is sent by a controller, wherein the first application-aware identifier is generated by the controller based on a user requirement of a service flow; and
when the target service flow is a service flow indicated by the first application-aware identifier, forward a service packet of the target service flow by using the first network service based on the correspondence.

16. The network system according to claim 12, wherein the network device is further configured to:
receive an identifier generation rule sent by the controller; and
generate a second application-aware identifier of the target service flow according to the identifier generation rule;
wherein the target application-aware identifier is the second application-aware identifier or the first application-aware identifier of the target service flow that is sent by the controller.

17. The network system according to claim 16, wherein the in-situ flow detection information is in-situ flow information telemetry (IFIT) information, and the network device is further configured to:
encapsulate the target application-aware identifier in a flow identifier field or a reserved field of the IFIT information, and
forward the service packet in which the target application-aware identifier is encapsulated.

18. The network system according to claim 12, wherein the network device is further configured to:
receive a sending policy of the target service flow that is sent by the controller, wherein the sending policy indicates to report the in-situ flow detection result of the target service flow; and
send the in-situ flow detection result and the target application-aware identifier of the target service flow to the controller based on the indication of the sending policy.

19. The network system according to claim 12, wherein the network device is further configured to:
send the in-situ flow detection result, the target application-aware identifier of the target service flow, and a corresponding in-situ flow detection flow identifier to the controller in the network.

* * * * *